United States Patent
Zhou

(10) Patent No.: US 8,565,800 B2
(45) Date of Patent: Oct. 22, 2013

(54) WIRELESS BASE STATION, AND METHOD OF SELECTING MOBILE TERMINAL

(75) Inventor: Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/987,126

(22) Filed: Jan. 9, 2011

(65) Prior Publication Data

US 2011/0190020 A1 Aug. 4, 2011

(30) Foreign Application Priority Data

Feb. 2, 2010 (JP) ................................. 2010-021232

(51) Int. Cl.
*H04B 7/00* (2006.01)

(52) U.S. Cl.
USPC .............................. 455/517; 455/561; 455/69

(58) Field of Classification Search
USPC ......... 455/561, 517, 524, 436, 439, 442, 509, 455/501; 370/329, 328, 332, 208, 248, 252, 370/331, 330, 352, 401, 210; 375/260, 267, 375/285, 348, 232, 350, 349, 147, 341
See application file for complete search history.

(56) References Cited

U.S. PATENT DOCUMENTS

| | | | |
|---|---|---|---|
| 2008/0037671 A1* | 2/2008 | Lee et al. | 375/260 |
| 2009/0016460 A1* | 1/2009 | Hwang et al. | 375/267 |

FOREIGN PATENT DOCUMENTS

JP 2007-20188 1/2007

* cited by examiner

*Primary Examiner* — Edward Urban
*Assistant Examiner* — Golam Sorowar
(74) *Attorney, Agent, or Firm* — Fujitsu Patent Center

(57) ABSTRACT

A wireless base station (10) includes: a selecting unit (16) which selects a mobile terminal (20), which realizes such a condition that a parameter satisfies a predetermined criterion, from a plurality of mobile terminals, the parameter being defined by an inverse matrix (B) of a predetermined matrix (G); and an updating unit (16) which updates the inverse matrix on the basis of the selected mobile terminal. The selecting unit selects new mobile terminal, which realizes such a condition that the parameter defined by the updated inverse matrix satisfies the predetermined criterion, from the other mobile terminals except the mobile terminal selected by the selecting unit out of the plurality of mobile terminals, every time the inverse matrix is updated by the updating unit.

10 Claims, 11 Drawing Sheets

WIRELESS BASE STATION, AND METHOD OF SELECTING MOBILE TERMINAL

CROSS-REFERENCE TO RELATED APPLICATIONS

This application is based upon and claims the benefit of priority of the prior Japanese Patent Application No. 2010-021232, file on Feb. 2, 2010, the entire contents of which are incorporated herein by reference.

FIELD

The present invention relates to a wireless base station which performs wireless communication with a mobile terminal and which is used in a MOMO (Multiple Input Multiple Output) communication system, and a method of selecting a mobile terminal in the wireless base station.

BACKGROUND ART

As a wireless communication system for improving a transmission rate by spatial multiplexing, or for improving reliability by a diversity effect using different propagation characteristics of a plurality of paths, a MIMO (Multiple Input Multiple Output) communication system has been proposed. In the MIMO communication system, for example, a wireless base station including a plurality of antennas can simultaneously transmit data to a plurality of mobile terminals by using the plurality of antenna. The wireless base station may select a communication-target mobile terminal (or communication-target mobile terminals) from the plurality of mobile terminal. Namely, the wireless base station may perform user scheduling process. Thereby the wireless base station may perform communication (i.e. data transmission and data reception) with the mobile terminal.

Patent document 1: Japanese Patent Application Laid Open No. 2007-20188

SUMMARY

Here, as a method of selecting the communication-target mobile terminal (or communication-target mobile terminals) from the plurality of mobile terminals, there is a method of selecting the communication-target mobile terminal (or communication-target mobile terminals) which can realize an optimum or maximum channel capacity of the MIMO communication system. In this method, the channel capacities or the like are calculated by arithmetic operation for all the candidates of combinations of the selected mobile terminals (or the selected mobile terminal). Then, one combination of the mobile terminals (or the mobile terminal) which can realize the optimum or maximum channel capacity is selected. For example, if N mobile terminals (wherein N is an integer satisfying 1≤N<M) are selected from M mobile terminals (wherein M is an integer more than 1), the wireless base station calculates the channel capacity or the like for each of the $_MC_N$ types of combinations of the mobile terminals (or the mobile terminal). However, as the number of the mobile terminals increases, the amount of arithmetic operation becomes enormous, which is technically problematic.

According to an aspect of the embodiment, a wireless base station performs multiple input multiple output communication with a plurality of mobile terminals. The wireless base station includes a selecting unit; and an updating unit. The selecting unit selects a mobile terminal, which realizes such a condition that a parameter satisfies a predetermined criterion, from the plurality of mobile terminals. The parameter is defined by an inverse matrix of a predetermined matrix. As the predetermined matrix, for example, there is listed a matrix used to calculate a channel capacity between the plurality of mobile terminals and the wireless base station, as one example. The updating unit updates the inverse matrix on the basis of the selected mobile terminal, every time the mobile terminal is selected by the selecting unit. Moreover, the selecting unit selects new mobile terminal, which realizes such a condition that the parameter defined by the updated inverse matrix satisfies the predetermined criterion, from the other mobile terminals except the mobile terminal selected by the selecting unit out of the plurality of mobile terminals, every time the inverse matrix is updated by the updating unit. In other words, according to the wireless base station, the mobile terminal (or the mobile terminals) is (are) sequentially selected while updating the inverse matrix directly or indirectly which is used to select the mobile terminal (or the mobile terminals).

According to another aspect of the embodiment, a method of selecting a mobile terminal includes: a selecting process; and an updating process. In the selecting process, the same operation as that performed by the selecting unit described above is performed. In the updating process, the same operation as that performed by the updating process described above is performed. Incidentally, the method of selecting the mobile terminal is performed by the wireless base station.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, the embodiments will be explained with reference to the drawings.

(1) Wireless Communication System

Figure 1:
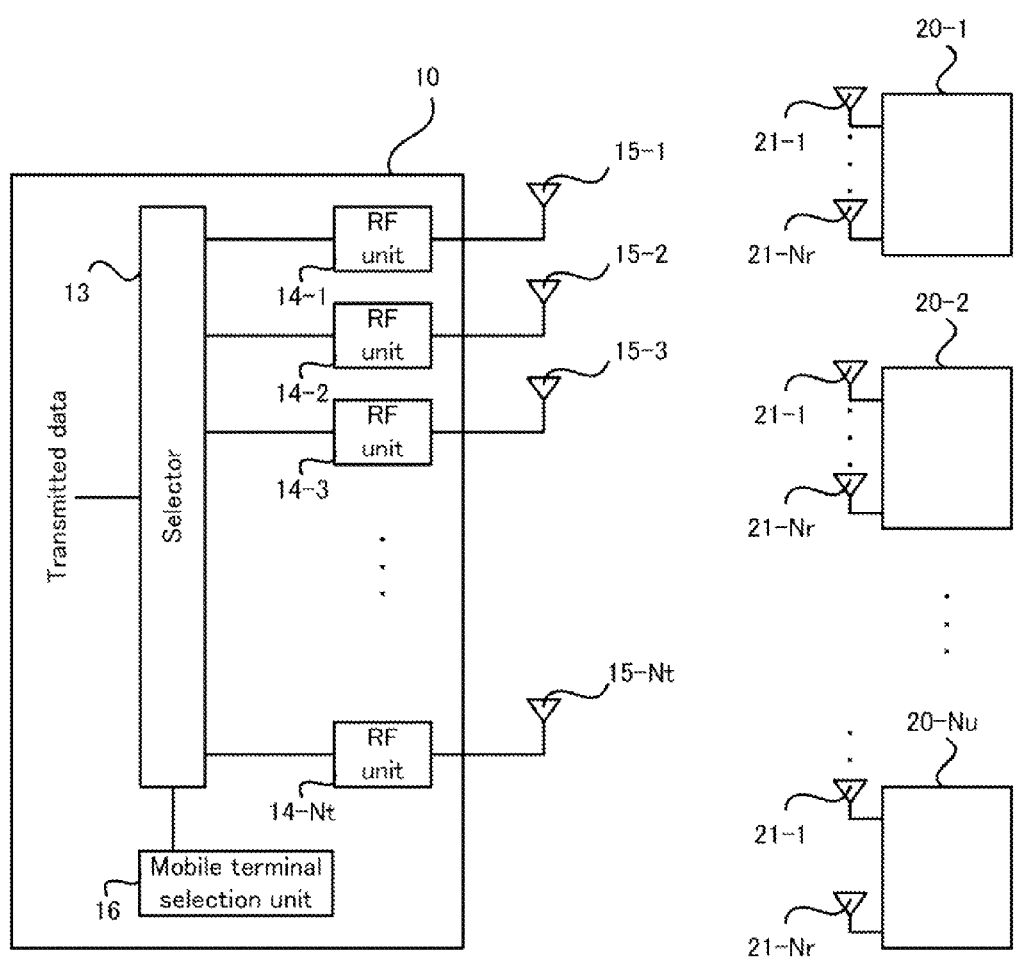
FIG. 1 is a block diagram illustrating one example of the configuration of a MIMO wireless communication system in an embodiment.

With reference to FIG. 1, an explanation will be given on one example of the configuration of a MIMO (Multi Input Multi Output) wireless communication system 1 in this embodiment. FIG. 1 is a block diagram illustrating one example of the configuration of the MIMO wireless communication system 1 in the embodiment.

As illustrated in FIG. 1, the MIMO wireless communication system 1 in the embodiment includes a wireless base station 10 and Nu (wherein Nu is an integer of 2 or more) mobile terminals 20 (i.e. a mobile terminal 20-1 to a mobile terminal 20-Nu). Incidentally, in a down link, the wireless base station 10 is a transmitter, and the mobile terminal 20 is a receiver. On the other hand, in an up link, the wireless base station 10 is a receiver, and the mobile terminal 20 is a transmitter. Moreover, as the wireless base station 10, there are listed a wireless base station (i.e. NB (Node B) and eNodeB (evolved NodeB)) in a mobile phone system or a mobile communication system and an access point in a wireless LAN system, as one example. Moreover, as the mobile terminal 20, there are listed a mobile phone in a mobile phone system and a client (e.g. a personal computer or the like) in a wireless LAN system, as one example.

The wireless base station 10 includes a selector 13; Nt (wherein Nt is an integer of 2 or more) RF units 14 (i.e. a RF unit 14-1 to a RF unit 14-Nt); Nt antennas 15 (i.e. an antenna 15-1 to an antenna 15-Nt); and a mobile terminal selection unit 16. Each of the Nu mobile terminals 20 includes Nr (wherein Nr is an integer of 1 or more) antennas 21 (i.e. an antenna 21-1 to an antenna 21-Nr). Incidentally, each of the Nu mobile terminals 20 may includes the same number of antennas 21, or the different number of antennas 21. In the explanation below, in order to simplify the explanation, each of the Nu mobile terminals 20 includes the Nr antennas 21-1 to 21-Nr.

The selector 13 sorts data to be transmitted to the Nu mobile terminals 20, into the Nt antennas 15-1 to 15-Nt. More specifically, the selector 13 supplies, to the Nt antennas 15-1 to 15-Nt, the data to be transmitted to at least one mobile terminal 20 which is selected as a data-transmission-destination by the mobile terminal selection unit 16, out of the data to be transmitted to the Nu mobile terminal 20-1 to 20-Nu. The data sorted by the selector 13 is transmitted to the mobile terminal 20 via the antennas 15-1 to 15-Nt after a mobile transmission process is performed by the RF units 14-1 to 14-Nt. Each of the mobile terminals 20 receives the data to be transmitted from the wireless base station 10 via respective one of the antennas 21-1 to 21-Nr.

Incidentally, the mobile terminal selection unit 16 selects the mobile terminal 20 which is the data-transmission-destination (or a communication-target), by an operation described later. The mobile terminal selection unit 16 preferably selects the mobile terminal 20 such that the total number of the antennas 21 provided for the selected mobile terminal 20 is equal to or less than the total number of the antennas 15 provided for the wireless base station 10. The operation of selecting the mobile terminal 20 may be performed in any timing, periodically or non-periodically. Moreover, the mobile terminal selection unit 16 preferably receives various control data, which may be used to calculate a channel capacity or channel estimation, from the mobile terminal 20. Or, the mobile terminal selection unit 16 preferably obtains the various control data from an internal processing circuit provided for the wireless base station 10.

(2) First Operation Example

Figure 2:
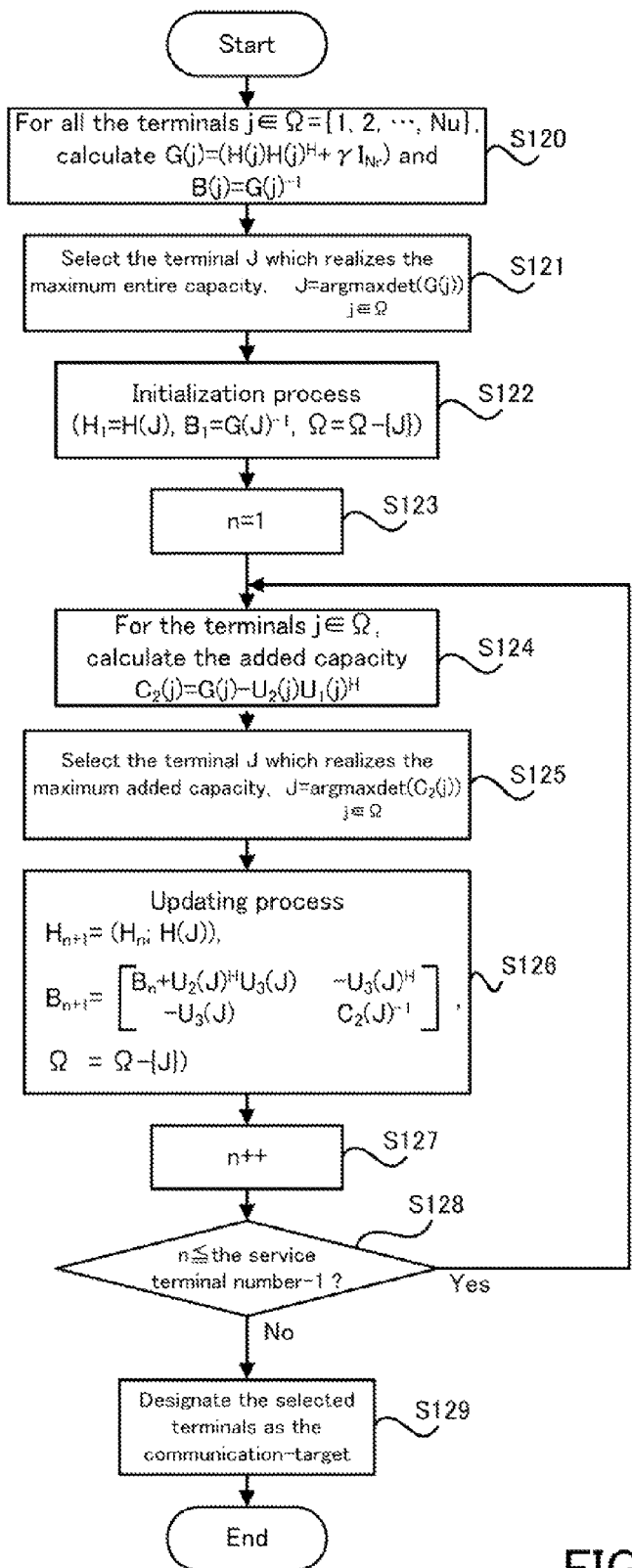
FIG. 2 is a flowchart illustrating a flow of a first operation example of a wireless base station.

With respect to FIG. 2, an explanation will be given on a first operation example of a scheduling operation (i.e. the operation of selecting the mobile terminal 20 which is the communication-target) performed by the mobile terminal selection unit 16 provided for the wireless base station 10 described above. FIG. 2 is a flowchart illustrating a flow of the first operation example of the wireless base station 10.

As illustrated in FIG. 2, the mobile terminal selection unit 16 calculates a matrix G(j) illustrated in an equation 2 and an inverse matrix B(j) of the matrix G(j) illustrated in an equation 3, for each of all the mobile terminals (in other words, users) 20-$j$ which belong to a set $\Omega$ illustrated in an equation 1 (step S120). In other words, the mobile terminal selection unit 16 calculates the matrix G(j) and the inverse matrix B(j) corresponding to each of the Nu mobile terminals 20-1 to 20-Nu.

$$j \in \Omega = \{1, 2, \ldots, Nu\} \quad \text{[Equation 1]}$$

$$G(j) = H(j)H(j)^H + \gamma I_{Nr} \quad \text{[Equation 2]}$$

$$B(j) = G(j)^{-1} = (H(j)^H H(j)^H + \gamma I_{Nr})^{-1} \quad \text{[Equation 3]}$$

Here, H(j) denotes a channel matrix between the wireless base station 10 and the mobile terminal 20-$j$. In other words, H(j) denotes a channel matrix between the Nt antennas 15-1 to 15-Nt provided for the wireless base station 10 and the Nr antennas 21-1 to 21-Nr provided for the mobile terminal 20-$j$. $\gamma$ denotes a value obtained by dividing the number Nt of the antennas 15-1 to 15-Nt provided for the wireless base station 10, by a signal-to-noise ratio $\rho$ (i.e. $\gamma$ denotes Nt/$\rho$). $I_{Nr}$ denotes an identity matrix whose number of the rows is Nr.

Then, the mobile terminal selection unit 16 selects the mobile terminal 20-J which realizes the maximum entire capacity detG(j) of the channel capacity in the virtual MIMO communication system including the wireless base station 10 and the mobile terminal 20-$j$, for each of all the mobile terminals (i.e. users) 20-$j$ which belong to the set $\Omega$ (step S121). In other words, the mobile terminal selection unit 16 selects the mobile terminal 20-J which satisfies an equation 4.

$$J = \underset{j \in \Omega}{\mathrm{argmax}}\, \det(G(j)) \quad \text{[Equation 4]}$$

Then, the mobile terminal selection unit 16 performs an initialization operation for the operation of selecting the mobile terminal 20 (step S122). Specifically, the mobile terminal selection unit 16 sets the channel matrix H(J) of the mobile terminal 20-J selected in the step S121, to an initial value $H_1$ of a channel matrix set $H_n$. The channel matrix set $H_1$ indicates the channel matrix of all the selected mobile terminals 20. Moreover, the mobile terminal selection unit 16 sets the inverse matrix B(J)=G(J)$^{-1}$ corresponding to the mobile terminal 20-J selected in the step S121, to an initial value $B_1$ of an inverse matrix $B_n$. The inverse matrix $B_n$ is an inverse matrix which reflects all the selected mobile terminals 20. Moreover, the mobile terminal selection unit 16 removes the mobile terminal 20-J selected in the step S121 from the set $\Omega$.

Then, the mobile terminal selection unit 16 sets a variable n to 1 (step S123). The variable n indicates the number of the selected mobile terminals 20.

Then, the mobile terminal selection unit 16 calculates a matrix $C_2(j)$ illustrated in an equation 5, for each of the mobile terminals (users) 20-$j$ which belong to the set $\Omega$ initialized in the step S122 (step S124). Incidentally, the determinant of the matrix $C_2(j)$ denotes an increment amount of the channel capacity which is caused by newly adding the mobile terminal 20-$j$ to the virtual MIMO communication system including the wireless base station 10 and the selected mobile terminal 20. Namely, the determinant of the matrix $C_2(j)$ denotes an added capacity. Therefore, the mobile terminal selection unit 16 may calculate the increment amount of the channel capacity (i.e. an added capacity det$C_2(j)$ or the determinant of the matrix $C_2(j)$) which is caused by newly adding the mobile terminal 20-$j$ to the virtual MIMO communication system including the wireless base station 10 and the selected mobile terminal 20, in addition to calculate the matrix $C_2(j)$ itself.

$$C_2(j)=G(j)-U_2(j)U_1(j)^H \quad \text{[Equation 5]}$$

Here, $U_2(j)$ and $U_1(j)$ are matrices defined by an equation 6 and an equation 7, respectively.

$$U_2(j)=U_1(j)B_n \quad \text{[Equation 6]}$$

$$U_1(j)=H(j)H_n^H \quad \text{[Equation 7]}$$

Then, the mobile terminal selection unit 16 selects the mobile terminal 20-J which realizes the maximum added capacity det$C_2(j)$ (step S125). In other words, the mobile terminal selection unit 16 selects the mobile terminal 20-J which satisfies an equation 8.

$$J = \underset{j \in \Omega}{\operatorname{argmax}} \det(C_2(j)) \quad \text{[Equation 8]}$$

Then, the mobile terminal selection unit 16 updates the channel matrix set $H_n$, the inverse matrix $B_n$, and the set $\Omega$ described above, in accordance with the selection of the mobile terminal 20-J in the step S125 (step S126). Specifically, the mobile terminal selection unit 16 sets a new matrix in which the channel matrix set $H_n$ before the updating and the channel matrix $H(J)$ of the mobile terminal 20-J selected in the step S125 are arranged in the row direction, as the channel matrix set $H_{n+1}$ after the updating. Moreover, the mobile terminal selection unit 16 calculates the inverse matrix $B_{n+1}$ after the updating from the inverse matrix $B_n$ before the updating, by using an equation 9. Moreover, the mobile terminal selection unit 16 removes the mobile terminal 20-J selected in the step S125 from the set $\Omega$.

$$B_{n+1} = \begin{bmatrix} B_n + U_2(J)^H U_3(J) & -U_2(J)^H \\ -U_3(J) & C_2(J)^{-1} \end{bmatrix} \quad \text{[Equation 9]}$$

Here, $U_3(J)$ is a matrix defined by an equation 10. Moreover, the matrices $U_1(J)$, $U_2(J)$ and $C_2(J)$ are already defined by the equation 7, the equation 6 and the equation 5, respectively.

$$U_3(J)=C_2(J)^{-1}U_2(J) \quad \text{[Equation 10]}$$

Then, the mobile terminal selection unit 16 increments the variable n by 1 (step S127). Then, the mobile terminal selection unit 16 judges whether or not the variable n is less than or equal to a value obtained by subtracting 1 from the service mobile terminal number (step S128). In other words, the mobile terminal selection unit 16 judges whether or not the variable n is less than or equal to a value obtained by subtracting 1 from the number of the selectable mobile terminals 20 (step S128).

As a result of the judgment in the step S128, if the variable n is less than or equal to the value obtained by subtracting 1 from the service mobile terminal number (the step S128: Yes), the mobile terminal selection unit 16 repeats the operations after the step S124. In other words, the mobile terminal selection unit 16 repeats the calculation of the matrix $C_2(j)$ or the added capacity det$C_2(j)$ for each of the mobile terminals (users) 20-$j$ which belong to the set $\Omega$ updated in the step S126, the selection of the mobile terminal 20-J which realizes the maximum added capacity det$C_2(j)$, and the updating of the channel matrix set $H_n$, the inverse matrix $B_n$, and the set $\Omega$.

On the other hand, as a result of the judgment in the step S128, if the variable n is not less than or equal to the value obtained by subtracting 1 from the service mobile terminal number (the step S128: No), the mobile terminal selection unit 16 designates the mobile terminals 20 selected in the step S121 and the step S125 as the communication-target of the wireless base station 10 (step S129). In other words, the mobile terminal selection unit 16 may not designate the mobile terminals 20 which are not selected in the step S121 and the step S125 as the communication-target of the wireless base station 10.

The aforementioned operations will be explained with reference to a specific example of selecting four mobile terminals 20 from fifteen mobile terminals 20 (i.e. a specific example in which Nu=15 and the service mobile terminal number=4).

Firstly, the mobile terminal selection unit 16 calculates G(1) to G(15) and B(1) to B(15), for the fifteen mobile terminals 20. In other words, the mobile terminal selection unit 16 performs a matrix calculation fifteen times. As a result, it is assumed that the mobile terminal 20-3 (i.e. J=3) is selected by the operation in the step S121. In this case, the mobile terminal selection unit 16 sets the channel matrix H(3) of the selected mobile terminal 20-3, to the initial value $H_1$ of the channel matrix set $H_n$ of all the selected mobile terminals 20. In other words, $H_1$=H(3). Moreover, the mobile terminal selection unit 16 sets the inverse matrix $B(3)=G(3)^{-1}$ corresponding to the selected mobile terminal 20-3, to the initial value $B_1$ of the inverse matrix $B_n$ reflecting all the selected mobile terminals 20. In other words, $B_1=B(3)=G(3)^{-1}=(H(3)H(3)^H+\gamma I_{N_r})^{-1}$. Moreover, the mobile terminal selection unit 16 removes the selected mobile terminal 20-3 from the set $\Omega$. In other words, $\Omega=\{1, 2, 4, 5, 6, 7, 8, 9, 10, 11, 12, 13, 14, 15\}$.

Then, the mobile terminal selection unit 16 calculates $C_2(1)$, $C_2(2)$, and $C_2(4)$ to $C_2(15)$, for the remaining fourteen mobile terminals 20. In other words, the mobile terminal selection unit 16 performs the matrix calculation fourteen times. As a result, it is assumed that the mobile terminal 20-6 (i.e. J=6) is selected by the operation in the step S125. In this case, the mobile terminal selection unit 16 sets a new matrix in which the channel matrix set $H_1$ before the updating and the channel matrix H(6) of the newly selected mobile terminal 20-6 are arranged in the row direction, as the channel matrix set $H_2$ after the updating. In other words, $H_2=(H_1; H(6))=(H(3); H(6))$. Moreover, the mobile terminal selection unit 16 calculates the inverse matrix $B_2$ after the updating from the initial matrix $B_1$ before the updating. Moreover, the mobile terminal selection unit 16 removes the selected mobile terminal 20-6 from the set $\Omega$. In other words, $\Omega=\{1, 2, 4, 5, 7, 8, 9, 10, 11, 12, 13, 14, 15\}$.

Then, the mobile terminal selection unit 16 calculates $C_2(1)$, $C_2(2)$, $C_2(4)$, $C_2(5)$, and $C_2(7)$ to $C_2(15)$, for the remaining thirteen mobile terminals 20. In other words, the mobile terminal selection unit 16 performs the matrix calculation thirteen times. As a result, it is assumed that the mobile terminal 20-1 (i.e. J=1) is selected by the operation in the step S125. In this case, the mobile terminal selection unit 16 sets a new matrix in which the channel matrix set $H_2$ before the updating and the channel matrix H(1) of the newly selected mobile terminal 20-1 are arranged in the row direction, as the channel matrix set $H_3$ after the updating. In other words, $H_3=(H_2; H(1))=(H(3); H(6); H(1))$. Moreover, the mobile terminal selection unit 16 calculates the inverse matrix $B_3$ after the updating from the initial matrix $B_2$ before the updating. Moreover, the mobile terminal selection unit 16 removes the selected mobile terminal 20-1 from the set Ω. In other words, Ω={2, 4, 5, 7, 8, 9, 10, 11, 12, 13, 14, 15}.

Then, the mobile terminal selection unit 16 calculates $C_2(2)$, $C_2(4)$, $C_2(5)$, and $C_2(7)$ to $C_2(15)$, for the remaining twelve mobile terminals 20. In other words, the mobile terminal selection unit 16 performs the matrix calculation twelve times. As a result, it is assumed that the mobile terminal 20-9 (i.e. J=9) is selected by the operation in the step S125. In this case, the mobile terminal selection unit 16 sets a new matrix in which the channel matrix set $H_3$ before the updating and the channel matrix H(9) of the newly selected mobile terminal 20-9 are arranged in the row direction, as the channel matrix set $H_4$ after the updating. In other words, $H_4=(H_3; H(9))=(H(3); H(6); H(1); H(9))$. Moreover, the mobile terminal selection unit 16 calculates the inverse matrix $B_4$ after the updating from the initial matrix $B_3$ before the updating. Moreover, the mobile terminal selection unit 16 removes the selected mobile terminal 20-9 from the set Ω. In other words, Ω={2, 4, 5, 7, 9, 10, 11, 12, 13, 14, 15}.

As explained above, according to the first operation example, it is possible to efficiently select n communication-target mobile terminals 20 from the Nu mobile terminals 20-1 to 20-Nu. More specifically, for example, if the four mobile terminals 20 are selected from the fifteen mobile terminals 20 described above, in order to calculate the entire capacity of all the combinations of the wireless base station 10 and the n mobile terminals 20, $_{15}C_4$=1365 times of matrix calculations are needed to be performed. On the other hand, according to the first operation example, 54 (=15+14+13+12) times of matrix calculations may suffice. In the same manner, if N mobile terminals 20 are selected from M mobile terminals 20, in order to calculate the entire capacity of all the combinations, $_MC_N$=M×(M−1)× ... ×(M−N−1)/(M−N)×(M−N−1) × ... ×1 times of matrix calculations are needed. On the other hand, according to the first operation example, M+ (M−1)+ ... +(M−N−1) times of matrix calculations may suffice. As described above, according to the first operation example, it is possible to reduce a processing load for the selection of the mobile terminals 20 which are the communication-targets.

In addition, according to the first operation example, it is also possible to recursively update the inverse matrix $B_n$. Thus, it is also possible to reduce a processing load for the arithmetic calculation of the inverse matrix $B_n$ which is performed every time the mobile terminal 20 is selected. In other words, in comparison with the configuration that the inverse matrix $B_n$ is sequentially calculated from scratch (i.e. the arithmetic calculation based on the aforementioned equations 2 and 3 is performed from scratch), it is also possible to reduce the processing load for the arithmetic calculation of the inverse matrix $B_n$.

Incidentally, the aforementioned explanation is about the MIMO wireless communication system 1 including the plurality of mobile terminals 20. However, the aforementioned operations may be applied in a MIMO wireless communication system including a single mobile terminal 20. For example, the aforementioned operations may be applied to an operation of selecting the antennas 21 (in other words, an operation of selecting the antennas 21 which is the communication-target) provided for the mobile terminal 20. In this case, the aforementioned "selection of the mobile terminal 20" is replaced by the "selection of the antenna 21", and the same equations can be used in each of the equations or the like.

(3) First Modified Operation Example in First Operation Example

Figure 3:
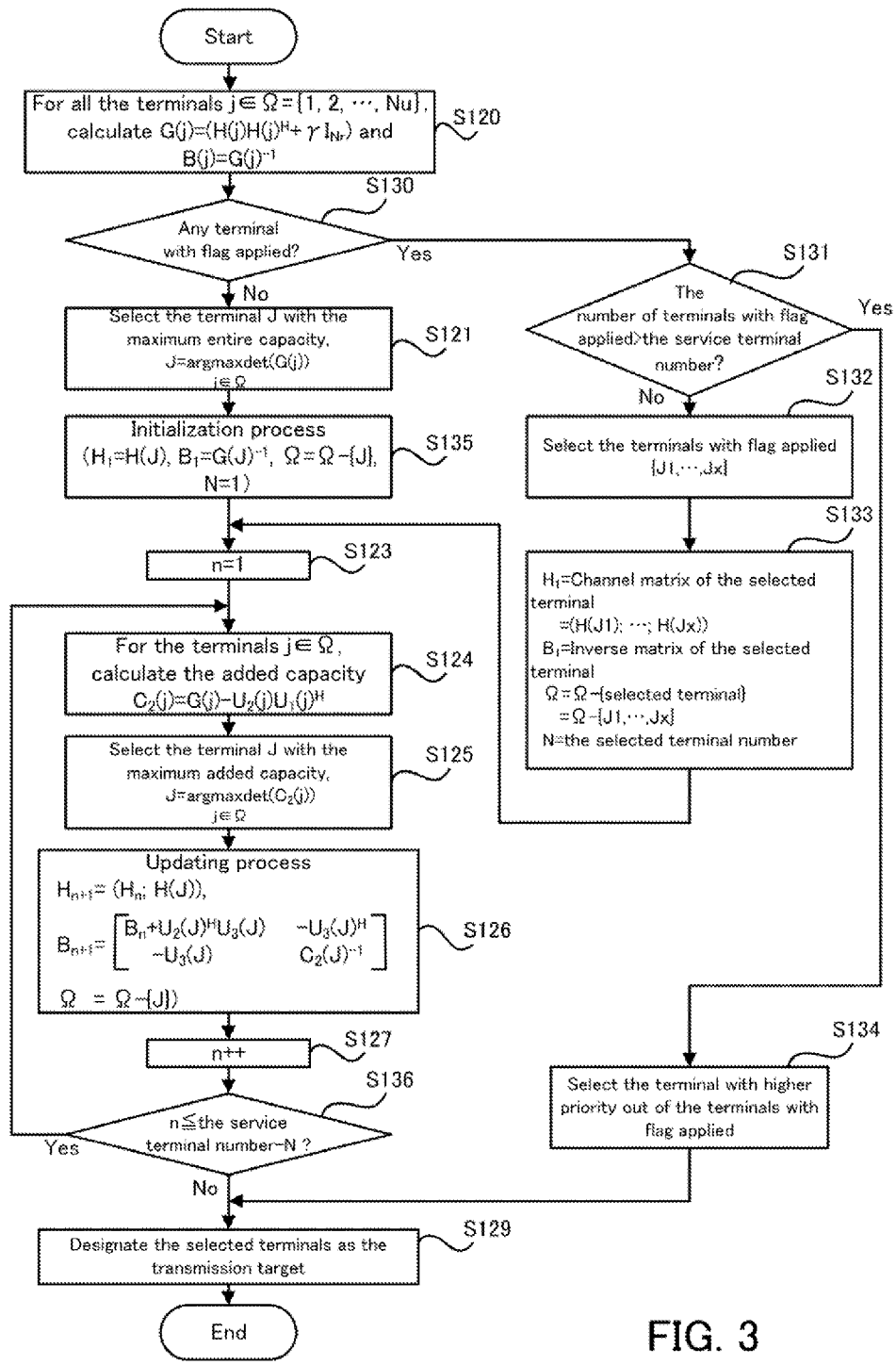
FIG. 3 is a flowchart illustrating a flow of a first modified operation example in the first operation example.

With reference to FIG. 3, a first modified operation example in the first operation example will be explained. FIG. 3 is a flowchart illustrating a flow of the first modified operation example in the first operation example. Incidentally, the same operations as the aforementioned operations which are already explained will carry the same step numbers, and the detailed explanation thereof will be omitted.

As illustrated in FIG. 3, in the first modified operation example in the first operation example, the mobile terminal selection unit 16 calculates the matrix G(j) illustrated in the above equation 2 and the inverse matrix B(j) of the matrix G(j) illustrated in the above equation 3, for each of all the mobile terminals 20-j which belong to the set Ω illustrated in the above equation 1 (the step S120).

Then, the mobile terminal selection unit 16 judges whether or not there is the mobile terminal 20 to which a priority flag is applied, wherein the priority flag is to identify the mobile terminal 20 which is preferentially selected as the communication-target (step S130).

The priority flag may be applied to the mobile terminal 20 which is preset to be preferentially selected as the communication-target. Alternatively, the priority flag may be applied to the mobile terminal 20 from which the number of communication requests to the wireless base station 10 is greater than or equal to a predetermined value (or is relatively large). Of course, the priority flag may be applied to the mobile terminal 20 by other standards. Moreover, the priority flag may be stored in a memory or the like provided for the wireless base station 10, as an internal parameter in the wireless base station 10. Alternatively, the priority flag may be stored in a memory or the like provided for the mobile terminal and may be transmitted from the mobile terminal 20 to the wireless base station 10 as control information, as occasion demands.

As a result of the judgment in the step S130, if it is judged that there is not the mobile terminal 20 to which the priority flag is applied (the step S130: No), the mobile terminal selection unit 16 selects the mobile terminal 20-J which realizes the maximum entire capacity detG(j) of the channel capacity in the virtual MIMO communication system including the wireless base station 10 and the mobile terminal 20-j (the step S121). Then, the mobile terminal selection unit 16 performs an initialization operation for the operation of selecting the mobile terminal 20 (step S135). Incidentally, in the initialization operation in the step S135, the operation of setting the initial value $H_1$ of the channel matrix set $H_n$, the operation of setting the initial value $B_1$ of the inverse matrix $B_n$, and the operation of setting the set Ω are the same as those in the initialization operation in the step S122 in FIG. 2. In the step S135, the mobile terminal selection unit 16 further sets a variable N to 1. The variable N indicates the number of the mobile terminals 20 selected before the operation of updating the inverse matrix $B_n$.

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (step S131).

As a result of the judgment in the step S131, if it is judged that the number of the mobile terminal 20 to which the priority flag is applied is greater than the service mobile terminal number (the step S131: Yes), the mobile terminal selection unit 16 designates the mobile terminal 20 (mobile terminals 20) with higher (or relatively high) priority from among the mobile terminals 20 with each of which the priority flag is applied, as the communication-target of the wireless base station 10 (step S134). In other words, the mobile terminal selection unit 16 may not designate the mobile terminal 20 (mobile terminals 20) with lower (or relatively low) priority, from among the mobile terminals 20 with each of which the priority flag is applied, as the communication-target of the wireless base station 10. Alternatively, the mobile terminal selection unit 16 designates the mobile terminals 20 with each of which the priority flag is applied, as the communication-target of the wireless base station 10 (step S134). In other words, the mobile terminal selection unit 16 may not designate the mobile terminal 20 except the mobile terminals 20 with each of which the priority flag is applied, as the communication-target of the wireless base station 10.

Incidentally, in order to perform the operation in the step S134, the priority flag may include information by which the degree (high or low) of the priority can be judged. For example, the priority flag may include information which indicates the degree (high or low) of the priority by binary values (e.g. "high (H)" and "low (L)") or multiple values. Alternatively, the priority flag may include the number of the communication requests for the wireless base station 10, as the information which indicates the degree (high or low) of the priority. In this case, if the number of the communication requests is relatively large (or greater than a predetermined value), it may be judged that the priority is relatively high. If the number of the communication requests is relatively small (or less than the predetermined value), it may be judged that the priority is relatively low. Of course, arbitrary information by which the degree (high or low) of the priority can be judged in other aspects may be also included in the priority flag.

On the other hand, as a result of the judgment in the step S131, if it is judged that the number of the mobile terminal 20 to which the priority flag is applied is not greater than the service mobile terminal number (the step S131: No), the mobile terminal selection unit 16 selects the mobile terminals 20 with each of which the priority flag is applied (step S132). For example, if the priority flag is applied to x (wherein x is an integer satisfying 1≤x≤Nu) mobile terminals 20-J1, 20-J2, . . . , 20-Jx out of the Nu mobile terminals 20, the mobile terminal selection unit 16 selects the x mobile terminals 20-J1, 20-J2, . . . , 20-Jx.

Then, the mobile terminal selection unit 16 performs an initialization operation for the operation of selecting the mobile terminal 20 (step S133). Specifically, the mobile terminal selection unit 16 sets a matrix in which the channel matrix H(J1), H(J2), . . . , and H(Jx) of the mobile terminals 20-J1, 20-J2, . . . , and 20-Jx selected in the step S132 are arranged in the row direction, to the initial value $H_1$ of the channel matrix set $H_n$ of all the selected mobile terminals 20. Moreover, the mobile terminal selection unit 16 sets the inverse matrix of the mobile terminals 20-J1, 20-J2, . . . , and 20-Jx calculated on the basis of the above equation 9 and matrices corresponding to the mobile terminals 20-J1, 20-J2, . . . , and 20-Jx selected in the step S132, to the initial value $B_1$ of an inverse matrix $B_n$ reflecting all the selected mobile terminals 20. Moreover, the mobile terminal selection unit 16 removes the mobile terminals 20-J1, 20-J2, . . . , and 20-Jx selected in the step S132 from the set Ω. Moreover, the mobile terminal selection unit 16 sets the number x of the mobile terminals 20 selected in the step S132, to the variable N.

After the operation in the step S133 or the step S135, the mobile terminal selection unit 16 sets the variable n to 1 (the step S123). The variable n indicates the number of the selected mobile terminals 20. Then, the mobile terminal selection unit 16 calculates the matrix $C_2(j)$ illustrated in the above equation 5 or the added capacity $detC_2(j)$, for each of the mobile terminals 20-$j$ which belong to the set Ω initialized in the step S133 or the step S135 (the step S124). Then, the mobile terminal selection unit selects the mobile terminal 20-J which realizes the maximum added capacity $detC_2(j)$ (the step S125). Then, the mobile terminal selection unit 16 updates the channel matrix set $H_n$, the inverse matrix $B_n$, and the set Ω described above, in accordance with the selection of the mobile terminal 20-J in the step S125 (the step S126).

Then, the mobile terminal selection unit 16 increments the variable n by 1 (the step S127). Then, the mobile terminal selection unit 16 judges whether or not the variable n is less than or equal to a value obtained by subtracting the variable N from the service mobile terminal number (i.e. the number of the selectable mobile terminals 20) (step S136).

As a result of the judgment in the step S136, if it is judged that the variable n is less than or equal to the value obtained by subtracting the variable N from the service mobile terminal number (the step S136: Yes), the mobile terminal selection unit 16 repeats the operations after the step S124.

On the other hand, as a result of the judgment in the step S136, if it is judged that the variable n is not less than or equal to the value obtained by subtracting the variable N from the service mobile terminal number (the step S136: No), the mobile terminal selection unit 16 designates the mobile terminals 20 selected in the step S121 or the step S132 and the step S125, as the communication-target of the wireless base station 10 (the step S129). In other words, the mobile terminal selection unit 16 may not designate the mobile terminals 20 which are not selected in the step S121, the step S132 and the step S125, as the communication-target of the wireless base station 10.

As explained above, according to the first modified operation example in the first operation example, it is possible to preferably receive the same effects as those received by the first operation example described above. In addition, according to the first modified operation example in the first operation example, it is possible to preferentially select the mobile terminals 20 with each of which the priority flag is applied, as the communication-target. Thus, even in the case where a part of the mobile terminals 20 hardly or cannot perform the communication in some channel situation, it is possible to ensure the communication with the part of the mobile terminals 20.

(4) Second Modified Operation Example in First Operation Example

Figure 4:
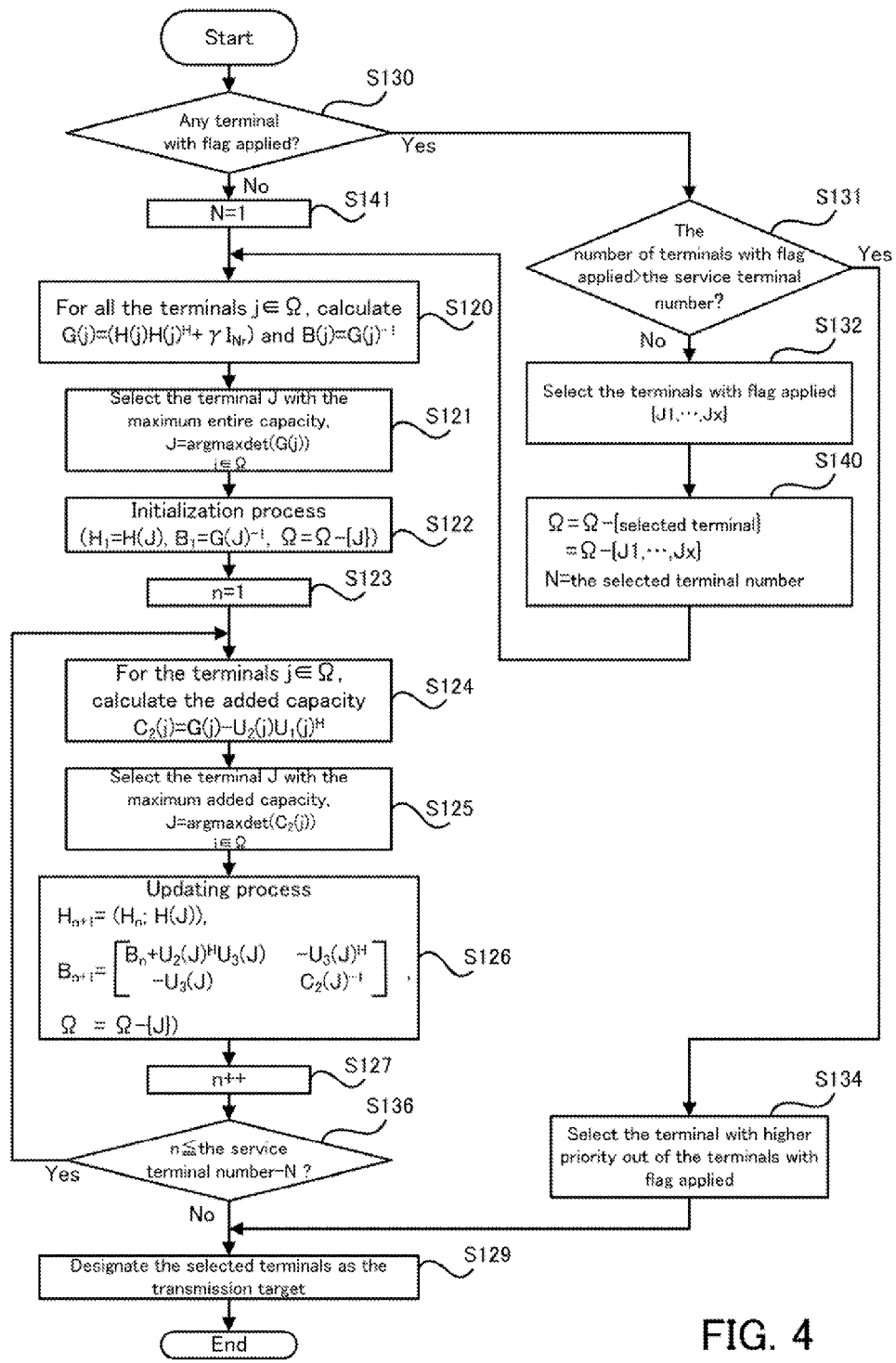
FIG. 4 is a flowchart illustrating a flow of a second modified operation example in the first operation example.

With reference to FIG. 4, a second modified operation example in the first operation example will be explained. FIG. 4 is a flowchart illustrating a flow of the second modified operation example in the first operation example. Incidentally, the same operations as the aforementioned operations which are already explained will carry the same step numbers, and the detailed explanation thereof will be omitted.

As illustrated in FIG. 4, in the second modified operation example in the first operation example, the mobile terminal selection unit 16 judges whether or not there is the mobile terminal 20 to which the priority flag is applied (the step S130).

As a result of the judgment in the step S130, if it is judged that there is not the mobile terminal 20 to which the priority flag is applied (the step S130: No), the mobile terminal selection unit 16 sets the variable N to 1 (step S141).

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (the step S131).

As a result of the judgment in the step S131, if it is judged that the number of the mobile terminal 20 to which the priority flag is applied is greater than the service mobile terminal number (the step S131: Yes), the mobile terminal selection unit 16 designates the mobile terminal 20 (mobile terminals 20) with higher (or relatively high) priority from among the mobile terminals 20 to each of which the priority flag is applied, as the communication-target of the wireless base station 10 (the step S134). Alternatively, the mobile terminal selection unit 16 designates the mobile terminals 20 to each of which the priority flag is applied, as the communication-target of the wireless base station 10 (the step S134).

On the other hand, as a result of the judgment in the step S131, if it is judged that the number of the mobile terminal 20 to which the priority flag is applied is not greater than the service mobile terminal number (the step S131: No), the mobile terminal selection unit 16 selects the mobile terminals 20 to each of which the priority flag is applied (the step S132). Then, the mobile terminal selection unit 16 performs an initialization operation for the operation of selecting the mobile terminal 20 (step S140). Specifically, the mobile terminal selection unit 16 removes the mobile terminals 20-J1, 20-J2, . . . , and 20-Jx selected in the step S132 from the set Ω. Moreover, the mobile terminal selection unit 16 sets the number of the mobile terminals 20 selected in the step S132, to the variable N.

After the operation in the step S141 or the step S140, the mobile terminal selection unit 16 calculates the matrix G(j) illustrated in the above equation 2 and the inverse matrix B(j) of the matrix G(j) illustrated in the above equation 3, for each of all the mobile terminals 20-$j$ which belong to the set Ω (the step S120). Incidentally, when the initial setting of the set Ω in the step S140 is performed, the mobile terminal selection unit 16 calculates the matrix G(j) and the inverse matrix B(j), for each of the other mobile terminals 20 except the mobile terminals 20 selected in the step S132. On the other hand, when the initial setting of the set Ω in the step S140 is not performed, the mobile terminal selection unit 16 calculates the matrix G(j) and the inverse matrix B(j), for each of all the mobile terminals 20 provided for the MIMO wireless communication system 1.

Then, the mobile terminal selection unit 16 selects the mobile terminal 20-J which realizes the maximum entire capacity detG(j) of the channel capacity in the virtual MIMO communication system including the wireless base station 10 and the mobile terminal 20-$j$ (the step S121). Then, the mobile terminal selection unit 16 performs the initialization operation for the operation of selecting the mobile terminal 20 (the step S122). After the step S122, the operations from the step S124 to the step S127, the step S129 and the step S136 are performed even in the second modified operation example, as in the first modified operation example.

As explained above, according to the second modified operation example in the first operation example, it is possible to preferably receive the same effects as those received by the first modified operation example in the first operation example described above. In addition, according to the second modified operation example in the first operation example, it is possible to set the initial value $H_1$ of the channel matrix set $H_n$ and the initial value $B_1$ of the inverse matrix $B_n$ after removing the mobile terminals 20 to each of which the priority flag is applied. Therefore, in comparison with the first modified operation example in the first operation example in which the initial value $H_1$ of the channel matrix set $H_n$ and the initial value $B_1$ of the inverse matrix $B_n$ are set while considering the mobile terminals 20 to each of which the priority flag is applied, it is possible to relatively reduce a processing load.

(5) Second Operation Example

Figure 5:
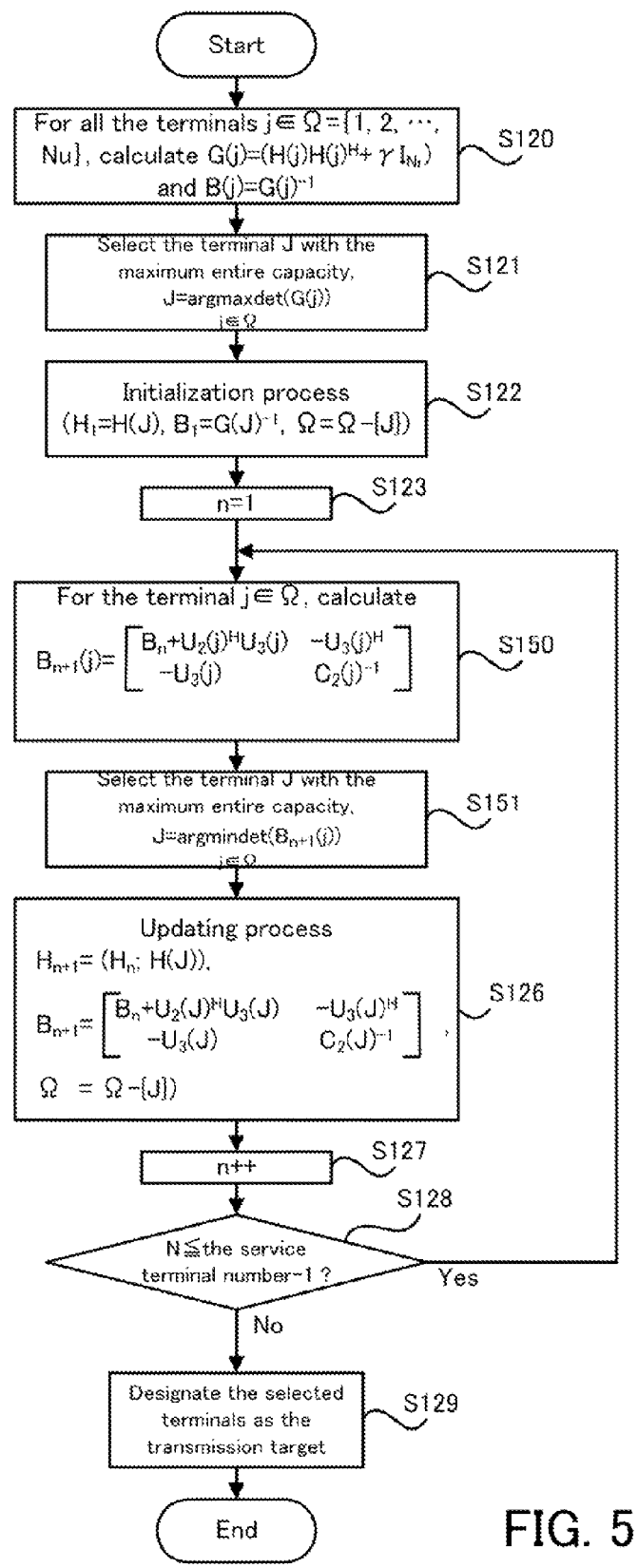
FIG. 5 is a flowchart illustrating a flow of a second operation example of the wireless base station.

With respect to FIG. 5, an explanation will be given on a second operation example of the scheduling operation performed by the mobile terminal selection unit 16 provided for the wireless base station 10 described above. FIG. 5 is a flowchart illustrating a flow of the second operation example of the wireless base station 10. Incidentally, the same operations as the aforementioned operations which are already explained will carry the same step numbers, and the detailed explanation thereof will be omitted.

As illustrated in FIG. 5, in the second operation example, the mobile terminal selection unit 16 selects the mobile terminal 20-J which realizes the maximum entire capacity detG(j), instead of the operation of selecting the mobile terminal 20-J which realizes the maximum added capacity det$C_2$(j) in the first operation example (refer to the step S124 and the step S125 in FIG. 2). More specifically, as illustrated in FIG. 5, in the second operation example, the mobile terminal selection unit 16 performs the operations from the step S120 to the step S123, as in the first operation example.

Then, the mobile terminal selection unit 16 calculates the inverse matrix $B_{n+1}$(j) by using the updating equation of the inverse matrix $B_n$ illustrated in the above equation 9, for each of the mobile terminals (users) 20-$j$ which belong to the set Ω initialized in the step S122 (step S150). Then, the mobile terminal selection unit 16 selects the mobile terminal 20-J which realizes the maximum entire capacity detG(j) (step S151). In other words, the mobile terminal selection unit 16 selects the mobile terminal 20-J which satisfies an equation 11.

$$J = \underset{j \in \Omega}{\mathrm{argmax}}\, \det(G(j)) = \underset{j \in \Omega}{\mathrm{argmin}}\, \det(B_{n+1}(j)) \qquad \text{[Equation 11]}$$

After the step S151, even in the second operation example, the operations from the step S126 to the step S129 are performed as in the first operation example.

As explained above, according to the second operation example, as in the first operation example, it is possible to reduce the processing load for the selection of the mobile terminals 20 which are the communication-targets. In other words, according to the second operation example, it is possible to preferably receive the same effects as those received by the first operation example.

Incidentally, the first modified operation example or the second modified operation example in the first operation example described above may be combined with the second operation example, as occasion demands. In other words, the operation using the priority flag may be combined with the second operation example.

(6) Third Operation Example

Figure 6:
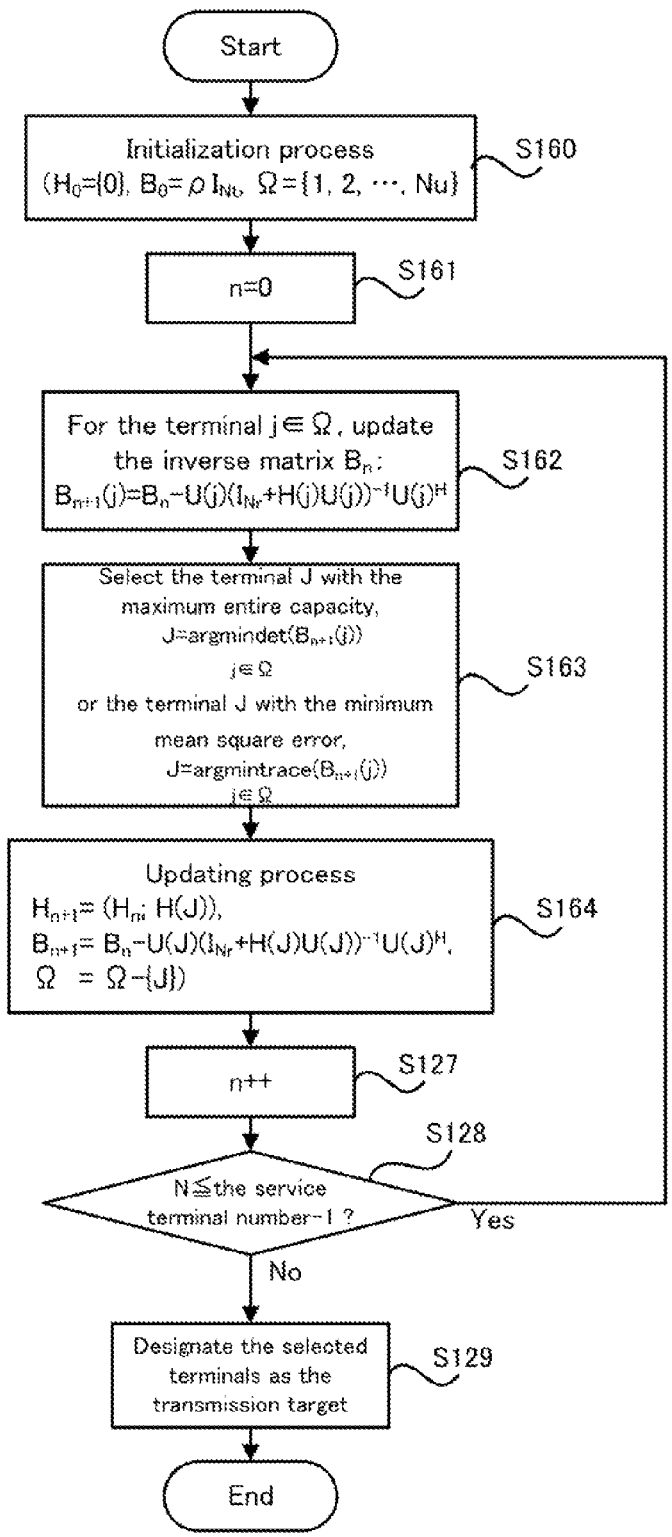
FIG. 6 is a flowchart illustrating a flow of a third operation example of the wireless base station.

With respect to FIG. 6, an explanation will be given on a third operation example of the scheduling operation performed by the mobile terminal selection unit 16 provided for the wireless base station 10 described above. FIG. 6 is a flowchart illustrating a flow of the third operation example of the wireless base station 10. Incidentally, the same operations as the aforementioned operations which are already explained will carry the same step numbers, and the detailed explanation thereof will be omitted.

As illustrated in FIG. 6, the mobile terminal selection unit 16 performs an initialization operation in the operation of selecting the mobile terminal 20 (step S160). Specifically, as illustrated in an equation 12, the mobile terminal selection unit 16 sets a {(matrix with no elements)}, to an initial value $H_0$ of the channel matrix set $H_n$. Moreover, as illustrated in an equation 13, the mobile terminal selection unit 16 sets $\rho I_{Nt}$ to an initial value $B_0$ of the inverse matrix $B_n$. $I_{Nt}$ denotes an identity matrix whose number of the rows is Nt. Moreover, as illustrated in an equation 14, the mobile terminal selection unit 16 sets all the mobile terminals 20-1 to 20-Nu to the set $\Omega$.

$$H_0 = \{\ \}$$ [Equation 12]

$$B_0 = \rho I_{Nt}$$ [Equation 13]

$$j \in \Omega = \{1, 2, \ldots, Nu\}$$ [Equation 14]

Then, the mobile terminal selection unit 16 sets the variable n to 0 (step S161). The variable n indicates the number of the selected mobile terminals 20.

Then, the mobile terminal selection unit 16 calculates the inverse matrix $B_{n+1}(j)$ after the updating from the inverse matrix $B_n$ before the updating, by using an equation 15, for each of all the mobile terminals 20-j which belong to the set $\Omega$ (step S162).

$$B_{n+1}(j) = B_n - U(j)(I_{Nr} + H(j)U(j))^{-1}U(j)^H$$ [Equation 15]

Here, U(j) is a matrix defined by an equation 16.

$$U(j) = B_n H(j)^H$$ [Equation 16]

Then, the mobile terminal selection unit 16 selects the mobile terminal 20-J which realizes the maximum entire capacity detG(j) (i.e. the minimum inverse $detB_{n+1}(j)$ of the entire capacity) (step S163). In other words, the mobile terminal selection unit 16 selects the mobile terminal 20-J which satisfies an equation 17. Alternatively, the mobile terminal selection unit 16 may select the mobile terminal 20-J which realizes the minimum mean square error of the inverse matrix $B_{n+1}(j)$ (step S163). In other words, the mobile terminal selection unit 16 may select the mobile terminal 20-J which satisfies an equation 18.

$$J = \underset{j \in \Omega}{\arg\min}\, \det(B_{n+1}(j))$$ [Equation 17]

$$J = \underset{j \in \Omega}{\arg\min}\, \mathrm{trace}(B_{n+1}(j))$$ [Equation 18]

Then, the mobile terminal selection unit 16 updates the channel matrix set $H_n$, the inverse matrix $B_n$, and the set $\Omega$ described above, in accordance with the selection of the mobile terminal 20-J in the step S163 (step S164). Specifically, the mobile terminal selection unit 16 sets a new matrix in which the channel matrix set $H_n$ before the updating and the channel matrix H(J) of the mobile terminal 20-J selected in the step S163 are arranged in the row direction, as the channel matrix set $H_{n+1}$ after the updating. Moreover, the mobile terminal selection unit 16 calculates the inverse matrix $B_{n+1}$ after the updating from the inverse matrix $B_n$ before the updating, by using an equation 19 (which is substantially the same as the equation 15). Moreover, the mobile terminal selection unit 16 removes the mobile terminal 20-J selected in the step S163 from the set $\Omega$.

$$B_{n+1}(J) = B_n - U(J)(I_{Nr} + H(J)U(J))^{-1}U(J)^H$$ [Equation 19]

Then, the mobile terminal selection unit 16 increments the variable n by 1 (the step S127). Then, the mobile terminal selection unit 16 judges whether or not the variable n is less than or equal to the value obtained by subtracting 1 from the service mobile terminal number (the step S128).

As a result of the judgment in the step S128, if the variable n is less than or equal to the value obtained by subtracting 1 from the service mobile terminal number (the step S128: Yes), the mobile terminal selection unit 16 repeats the operations after the step S162. In other words, the mobile terminal selection unit 16 repeats the calculation of the inverse matrix $B_{n+1}(j)$ after the updating for each of the mobile terminals 20-j which belong to the set $\Omega$ updated in the step S164, the selection of the mobile terminal 20-J which realizes the minimum inverse $detB_{n+1}(j)$ of the entire capacity or which realizes the minimum mean square error $\mathrm{trace}B_{n+1}(j)$ of the inverse matrix $B_{n+1}(j)$, and the updating of the channel matrix set $H_n$, the inverse matrix $B_n$, and the set $\Omega$.

On the other hand, as a result of the judgment in the step S128, if the variable n is not less than or equal to the value obtained by subtracting 1 from the service mobile terminal number (the step S128: No), the mobile terminal selection unit 16 designates the mobile terminals 20 selected in the step S163 as the communication-target of the wireless base station 10 (the step S129). In other words, the mobile terminal selection unit 16 may not designate the mobile terminals 20 which are not selected in the step S163 as the communication-target of the wireless base station 10.

As explained above, according to the third operation example, as in the first operation example, it is possible to reduce the processing load for the selection of the mobile terminals 20 which are the communication-targets. In other words, according to the third operation example, it is possible to preferably receive the same effects as those received by the first operation example.

(7) First Modified Operation Example in Third Operation Example

Figure 7:
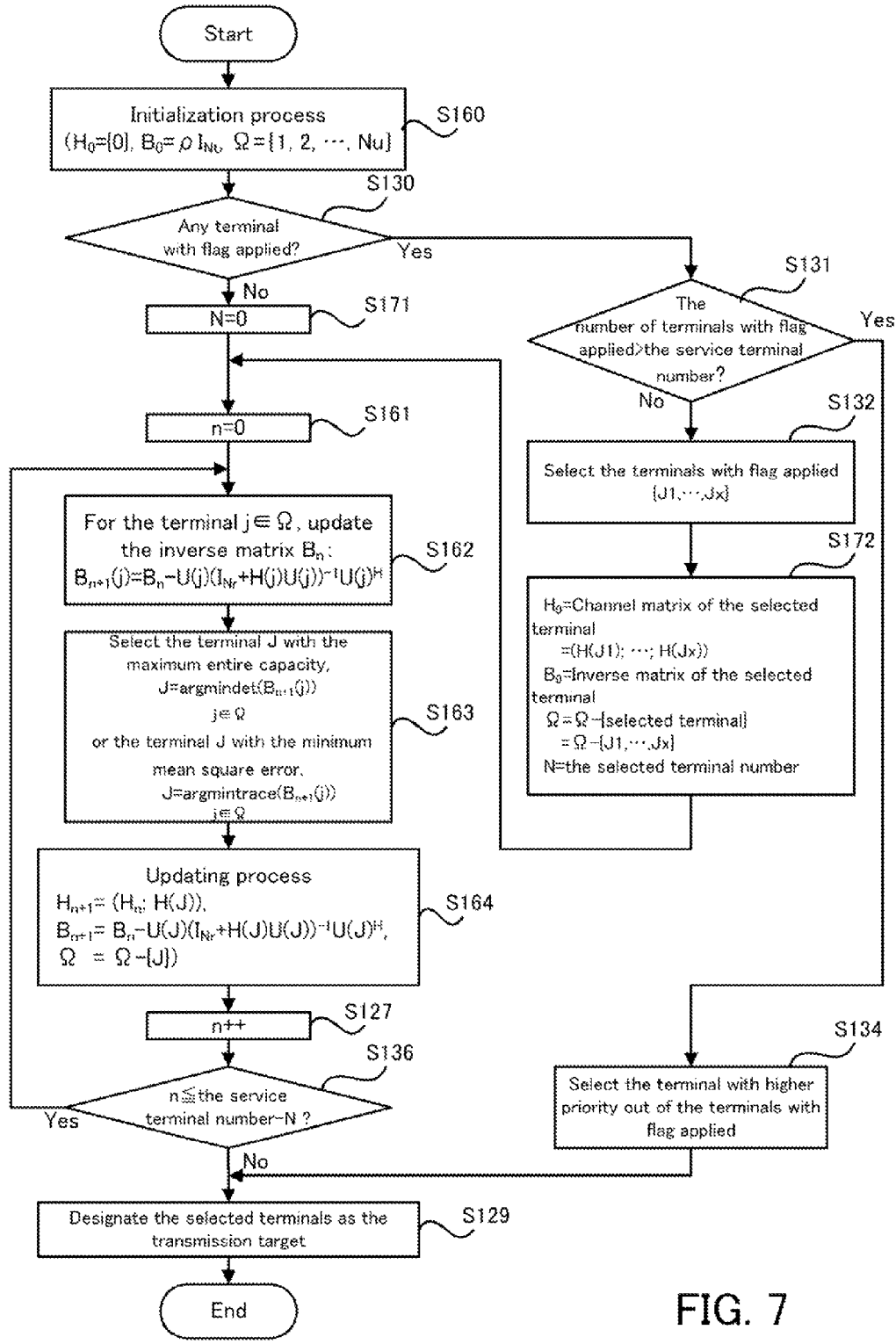
FIG. 7 is a flowchart illustrating a flow of a first modified operation example in the third operation example.

With reference to FIG. 7, a first modified operation example in the third operation example will be explained. FIG. 7 is a flowchart illustrating a flow of the first modified operation example in the third operation example. Incidentally, the same operations as the aforementioned operations which are already explained will carry the same step numbers, and the detailed explanation thereof will be omitted.

As illustrated in FIG. 7, the mobile terminal selection unit 16 performs the initialization operation for the operation of selecting the mobile terminal 20 (the step S160). Then, the mobile terminal selection unit 16 judges whether or not there is the mobile terminal 20 to which the priority flag is applied (the step S130).

As a result of the judgment in the step S130, if it is judged that there is not the mobile terminal 20 to which the priority flag is applied (the step S130: No), the mobile terminal selection unit 16 sets the variable N to 0 (step S171).

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (the step S131).

As a result of the judgment in the step S131, if it is judged that the number of the mobile terminal 20 to which the priority flag is applied is greater than the service mobile terminal number (the step S131: Yes), the mobile terminal selection unit 16 designates the mobile terminal 20 (mobile terminals 20) with higher (or relatively high) priority from among the mobile terminals 20 to each of which the priority flag is applied, as the communication-target of the wireless base station 10 (the step S134).

On the other hand, as a result of the judgment in the step S131, if it is judged that the number of the mobile terminal 20 to which the priority flag is applied is not greater than the service mobile terminal number (the step S131: No), the mobile terminal selection unit 16 selects the mobile terminals 20 to each of which the priority flag is applied (the step S132). Then, the mobile terminal selection unit 16 performs an initialization operation for the operation of selecting the mobile terminal 20 (step S172). Specifically, the mobile terminal selection unit 16 sets a matrix in which the channel matrices H(J1), H(J2), ..., and H(Jx) of the mobile terminals 20-J1, 20-J2, ..., and 20-Jx selected in the step S132 are arranged in the row direction, to the initial value $H_0$ of the channel matrix set $H_n$ of al the selected mobile terminals 20. Moreover, the mobile terminal selection unit 16 sets the inverse matrix of the mobile terminals 20-J1, 20-J2, ..., and 20-Jx, calculated on the basis of the equation 19 and the matrices corresponding to the mobile terminals 20-J1, 20-J2, ..., and 20-Jx selected in the step S132, to the initial value $B_0$ of the inverse matrix $B_n$ reflecting all the selected mobile terminals 20. Moreover, the mobile terminal selection unit 16 removes the mobile terminals 20-J1, 20-J2, ..., and 20-Jx selected in the step S132 from the set Ω. Moreover, the mobile terminal selection unit 16 sets the number x of the mobile terminals 20 selected in the step S132, to the variable N.

After the operation in the step S171 or the step S172, the mobile terminal selection unit 16 sets the variable n to 0 (the step S161). The variable n indicates the number of the selected mobile terminals 20. Then, the mobile terminal selection unit 16 calculates the inverse matrix $B_{n+1}(j)$ after the updating from the inverse matrix $B_n$ before the updating, by using the equation 15, for each of all the mobile terminals 20-$j$ which belong to the set Ω (the step S162). Then, the mobile terminal selection unit 16 selects the mobile terminal 20-J which realizes the minimum inverse $detB_{n+1}(j)$ of the entire capacity (the step S163). Alternatively, the mobile terminal selection unit 16 may select the mobile terminal 20-J which realizes the minimum mean square error of the inverse matrix $B_{n+1}(j)$ (the step S163). Then, the mobile terminal selection unit 16 updates the channel matrix set $H_n$, the inverse matrix $B_n$, and the set α described above, in accordance with the selection of the mobile terminal 20-J in the step S163 (the step S164). Then, the mobile terminal selection unit 16 increments the variable n by 1 (the step S127).

Then, the mobile terminal selection unit 16 judges whether or not the variable n is less than or equal to the value obtained by subtracting the variable N from the service mobile terminal number (the step S136).

As a result of the judgment in the step S136, if it is judged that the variable n is less than or equal to the value obtained by subtracting the variable N from the service mobile terminal number (the step S136: Yes), the mobile terminal selection unit 16 repeats the operations after the step S162. On the other hand, as a result of the judgment in the step S136, if it is judged that the variable n is not less than or equal to the value obtained by subtracting the variable N from the service mobile terminal number (the step S136: No), the mobile terminal selection unit 16 designates the mobile terminals 20 selected in the step S132 and the step S163, as the communication-target of the wireless base station 10 (the step S129).

As explained above, according to the first modified operation example in the third operation example, it is possible to preferably receive the same effects as those received by the third operation example described above. In addition, according to the first modified operation example in the third operation example, it is possible to preferentially select the mobile terminals 20 to each of which the priority flag is applied, as the communication-target. Thus, even in the case where a part of the mobile terminals 20 hardly or cannot perform the communication in some channel situation, it is possible to ensure the communication with the part of the mobile terminals 20.

(8) Second Modified Operation Example in Third Operation Example

Figure 8:
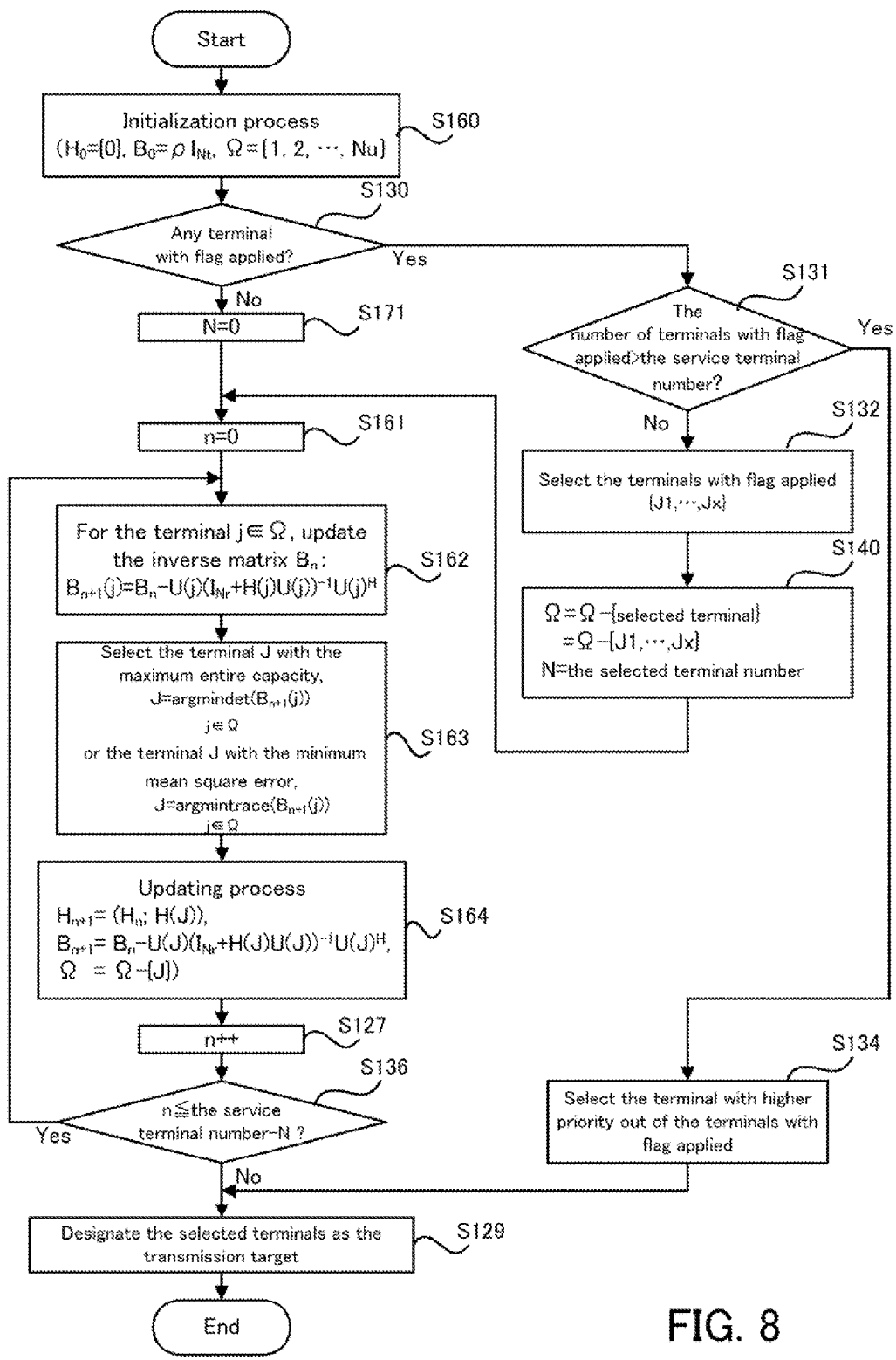
FIG. 8 is a flowchart illustrating a flow of a second modified operation example in the third operation example.

With reference to FIG. 8, a second modified operation example in the third operation example will be explained. FIG. 8 is a flowchart illustrating a flow of the second modified operation example in the third operation example. Incidentally, the same operations as the aforementioned operations which are already explained will carry the same step numbers, and the detailed explanation thereof will be omitted.

As illustrated in FIG. 8, the mobile terminal selection unit 16 performs the initialization operation for the operation of selecting the mobile terminal 20 (the step S160). Then, the mobile terminal selection unit 16 judges whether or not there is the mobile terminal 20 to which the priority flag is applied (the step S130).

As a result of the judgment in the step S130, if it is judged that there is not the mobile terminal 20 to which the priority flag is applied (the step S130: No), the mobile terminal selection unit 16 sets the variable N to 0 (the step S171).

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (the step S131).

As a result of the judgment in the step S131, if it is judged that the number of the mobile terminal 20 to which the priority flag is applied is greater than the service mobile terminal number (the step S131: Yes), the mobile terminal selection unit 16 designates the mobile terminal 20 (mobile terminals 20) with higher (or relatively high) priority from among the mobile terminals 20 to each of which the priority flag is applied, as the communication-target of the wireless base station 10 (the step S134).

On the other hand, as a result of the judgment in the step S131, if it is judged that the number of the mobile terminal 20 to which the priority flag is applied is not greater than the service mobile terminal number (the step S131: No), the mobile terminal selection unit 16 selects the mobile terminals 20 to each of which the priority flag is applied (the step S132). Then, the mobile terminal selection unit 16 performs the initialization operation for the operation of selecting the mobile terminal 20 (the step S140). Specifically, the mobile terminal selection unit 16 sets the set Ω and the variable N, as in the second modified operation example in the first operation example.

After the operation in the step S171 or the step S140, the operations from the step S161 to the step S164, the step S127, the step S136 and the step S129 are performed, as in the first modified operation example in the third operation example.

As explained above, according to the second modified operation example in the third operation example, it is possible to preferably receive the same effects as those received by the first modified operation example in the third operation example described above. In addition, according to the second modified operation example in the third operation example, it is possible to set the initial value $H_0$ of the channel matrix set $H_n$ and the initial value $B_0$ of the inverse matrix $B_n$ after removing the mobile terminals 20 to each of which the priority flag is applied. Therefore, in comparison with the first modified operation example in the third operation example in which the initial value $H_0$ of the channel matrix set $H_n$ and the initial value $B_0$ of the inverse matrix $B_n$ are set while considering the mobile terminals 20 to each of which the priority flag is applied, it is possible to relatively reduce the processing load.

(9) Fourth Operation Example

Figure 9:
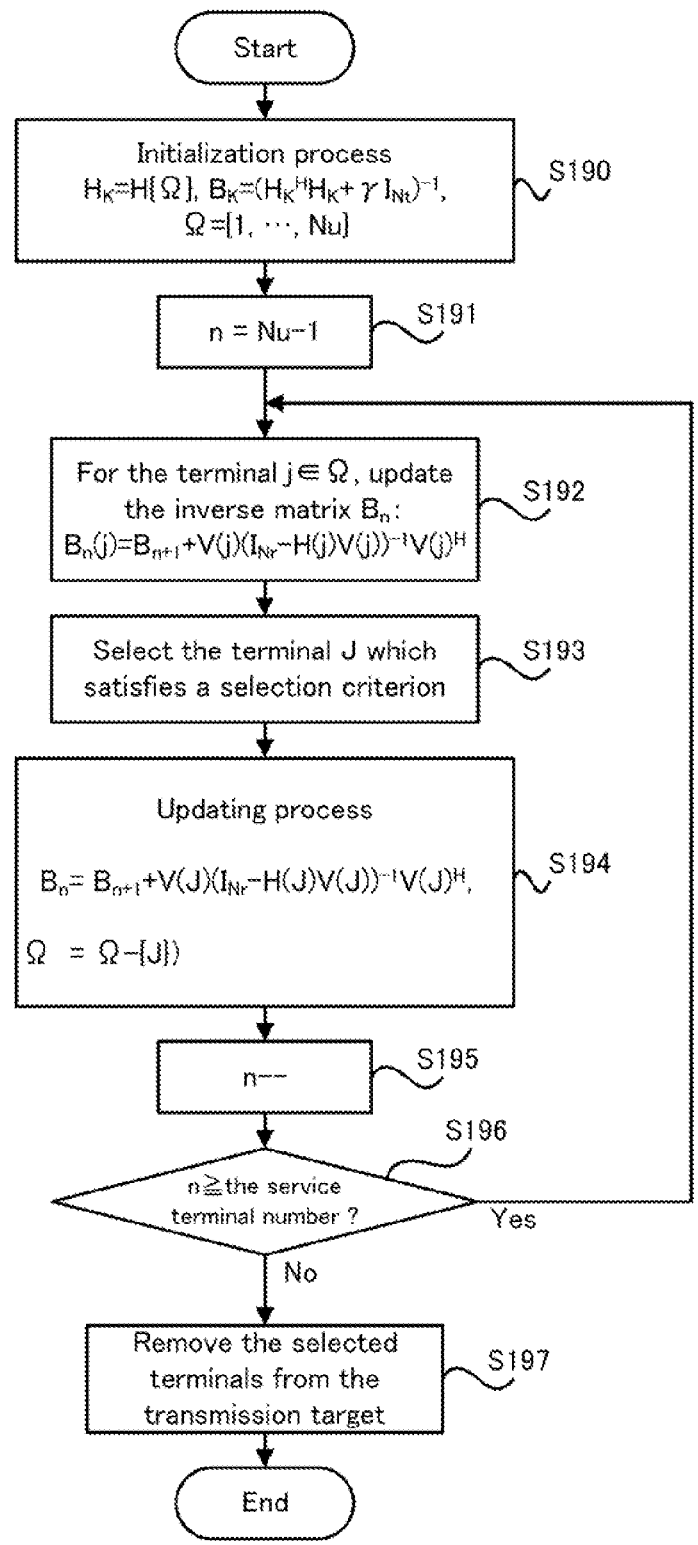
FIG. 9 is a flowchart illustrating a flow of a fourth operation example of the wireless base station.

With respect to FIG. 9, an explanation will be given on a fourth operation example of the scheduling operation performed by the mobile terminal selection unit 16 provided for the wireless base station 10 described above. FIG. 9 is a flowchart illustrating a flow of the fourth operation example of the wireless base station 10. Incidentally, the same operations as the aforementioned operations which are already explained will carry the same step numbers, and the detailed explanation thereof will be omitted.

As illustrated in FIG. 9, the mobile terminal selection unit 16 performs an initialization operation for the operation of selecting the mobile terminal 20 (step S190). Specifically, the mobile terminal selection unit 16 sets all the mobile terminals 20-1 to 20-Nu to the set Ω. Moreover, the mobile terminal selection unit 16 sets a matrix in which the channel matrices H(1), H(2), . . . , and H(Nu) of the Nu mobile terminals 20-1, 20-2, . . . , and 20-Nu which belong to the set Ω are arranged in the row direction, to an initial value $H_K$ of the channel matrix set $H_n$. Moreover, the mobile terminal selection unit 16 sets an initial value $B_K$ of the inverse matrix $B_n$ by using an equation 20.

$$B_K = (H_K^H H_K + \gamma I_{Nt})^{-1} \quad \text{[Equation 20]}$$

Here, the mobile terminal selection unit 16 may set the initial value $B_K$ of the inverse matrix $B_n$ by using a recursive equation, as in the first operation example or the like. Specifically, the mobile terminal selection unit 16 firstly defines $H_n$ which is the channel matrix set between all the mobile terminals 20-1 to 20-Nu and n antennas 15 from among the Nt antennas 15-1 to 15-Nt provided for the wireless base station 10, and then defines the inverse matrix $B_n$ related to the channel matrix set $H_n$ as illustrated in an equation 21.

$$B_n = (H_n^H H_n + \gamma I_n)^{-1} \quad \text{[Equation 21]}$$

Then, the mobile terminal selection unit 16 updates the inverse matrix $B_n$, which is an inverse matrix obtained when the antenna 15-$j$ is sequentially added to the virtual MIMO wireless communication system including all the mobile terminals 20-1 to 20-Nu and the Nt antennas 15-1 to 15-Nt, by using a recursive equation illustrated in an equation 22. As a result, the resulting inverse matrix $B_n$ is the initial value $B_K$ of the inverse matrix $B_n$ set in the step S190.

$$B_{n+1} = \begin{bmatrix} B_n + \dfrac{u_3(j)u_3(j)^H}{d(j)} & -u_3(j) \\ -u_3(j)^H & d(j) \end{bmatrix} \quad \text{[Equation 22]}$$

Here, $u_3(j)$ and $d(j)$ are matrices defined by an equation 23 and an equation 24, respectively.

$$u_3(j) = d(j) u_2(j) \quad \text{[Equation 23]}$$

$$d(j) = \dfrac{1}{g(j) - u_1(j)^H u_2(j)} \quad \text{[Equation 24]}$$

Here, $u_1(j)$, $u_2(j)$ and $g(j)$ are matrices defined by an equation 25, an equation 26, and an equation 27, respectively.

$$u_1(j) = H_n^H h(j) \quad \text{[Equation 25]}$$

$$u_2(j) = B_n u_1(j) \quad \text{[Equation 26]}$$

$$g(j) = h(j)^H h(j) + \gamma \quad \text{[Equation 27]}$$

Here, $h(j)$ is the channel matrix of the added antenna 15-$j$.

Then, the mobile terminal selection unit 16 sets the variable n to Nu-1 (step S191). Then, the mobile terminal selection unit 16 calculates the inverse matrix $B_n(j)$ after the updating from the inverse matrix $B_{n+1}$ before the updating, by using an equation 28, for each of all the mobile terminals 20-$j$ which belong to the set Ω (step S192).

$$B_n(j) = B_{n+1} + V(j)(I_{Nr} - H(j)V(j))^{-1} V(j)^H \quad \text{[Equation 28]}$$

Here, $V(j)$ is a matrix defined by an equation 29.

$$V(j) = B_{n+1} H(j)^H \quad \text{[Equation 29]}$$

Then, the mobile terminal selection unit 16 selects the mobile terminal 20-J which satisfies a predetermined selection criterion (step S193). Incidentally, in the fourth operation example, the mobile terminal 20 selected in the step S193 is the mobile terminal 20 which is not the communication-target of the wireless base station 10. For example, the mobile terminal selection unit 16 may select the mobile terminal 20-J which realizes the minimum mean square error of the inverse matrix $B_n(j)$ obtained by removing the mobile terminal 20-$j$ from the virtual MIMO communication system. Alternatively, for example, the mobile terminal selection unit 16 may select the mobile terminal 20-J which realizes the minimum product of the on-diagonal elements of the inverse matrix $B_n(j)$ (in other words, which realizes the minimum inverse of the product of the signal-to-noise ratios). Alternatively, for example, the mobile terminal selection unit 16 may select the mobile terminal 20-J which realizes the maximum sum of the inversed on-diagonal elements of the inverse matrix $B_n(j)$. Alternatively, for example, the mobile terminal selection unit 16 may select the mobile terminal 20-J which realizes the minimum determinant of the inverse matrix $B_n(j)$ (i.e. which realizes the maximum entire capacity). Alternatively, for example, the mobile terminal selection unit 16 may select the mobile terminal 20-J which realizes the minimum combination of the maximum values of the on-diagonal elements of the inverse matrix $B_n(j)$ (i.e. which realizes the minimum block error rate (BER)).

Then, the mobile terminal selection unit 16 updates the channel matrix set $H_n$, the inverse matrix $B_n$, and the set Ω described above, in accordance with the selection of the mobile terminal 20-J in the step S193 (step S194). Specifically, the mobile terminal selection unit 16 calculates the inverse matrix $B_n$ after the updating from the inverse matrix $B_{n+1}$ before the updating, by using an equation 30 (which is substantially the same as the equation 28). Moreover, the mobile terminal selection unit 16 removes the mobile terminal 20-J selected in the step S193 from the set Ω.

$$B_n(J) = B_{n+1} + V(J)(I_{Nr} - H(J)V(J))^{-1} V(J)^H \quad \text{[Equation 30]}$$

Then, the mobile terminal selection unit 16 decrements the variable n by 1 (step S195). Then, the mobile terminal selection unit 16 judges whether or not the variable n is greater than or equal to the service mobile terminal number (step S196).

As a result of the judgment in the step S196, if it is judged that the variable n is greater than or equal to the service mobile terminal number (the step S196: Yes), the mobile terminal selection unit 16 repeats the operations after the step S192. In other words, the mobile terminal selection unit 16 repeats the calculation of the inverse matrix $B_n(j)$ after the updating for each of the mobile terminals 20-$j$ which belong to the set $\Omega$ updated in the step S194, the selection of the mobile terminal 20-J which satisfies the predetermined criterion, and the updating of the inverse matrix $B_n$ and the set $\Omega$.

On the other hand, as a result of the judgment in the step S196, if it is judged that the variable n is not greater than or equal to the service mobile terminal number (the step S196: No), the mobile terminal selection unit 16 removes the mobile terminals 20 selected in the step S193 from the communication-target of the wireless base station 10 (step S197). In other words, the mobile terminal selection unit 16 designates the mobile terminals 20 which are not selected in the step S193 as the communication-target of the wireless base station 10.

As explained above, according to the fourth operation example, as in the first operation example, it is possible to reduce the processing load for the selection of the mobile terminals 20 which are the communication-targets. In other words, according to the fourth operation example, it is possible to preferably receive the same effects as those received by the first operation example.

In addition, according to the fourth operation example, it is possible to sequentially select the mobile terminals 20 which are not the communication-target (in other words, which are removed from the communication-target). Thus, if the number of the mobile terminals 20, which are the communication-targets, is greater than the number of the mobile terminals 20, which are not the communication-target, the mobile terminals 20 which are the communication-targets can be selected more efficiently. For example, an explanation will be given on a specific example in a case where twelve mobile terminals 20 are selected from fifteen mobile terminals 20 as the communication-target (in other words, three mobile terminals 20 from among the fifteen mobile terminals 20 are removed from the communication target). For example, in the first to third operation examples in which the mobile terminals 20 which are the communication-targets are sequentially selected, 114 (=15+14+ . . . +5+4) times of matrix calculation may be performed. On the other hand, in the fourth operation example, 42 (=15+14+13) times of matrix calculations may be performed. As described above, according to the fourth operation example, if the service mobile terminal number is relatively large, it is possible to further reduce the processing load for the selection of the communication-target mobile terminals 20.

On the other hand, if the number of the mobile terminals 20, which are the communication-targets, is less than the number of the mobile terminals 20, which are not the communication-target, the mobile terminals 20 which are the communication-target can be selected more efficiently in the first to third operation examples than the fourth operation example. For example, an explanation will be given on a specific example in a case where four mobile terminals 20 are selected from fifteen mobile terminals 20 as the communication-target (in other words, eleven mobile terminals 20 from among the fifteen mobile terminals 20 are removed from the communication target). For example, in the fourth operation example in which the communication-target mobile terminals 20 are removed, 110 (=15+14+ . . . +5) times of matrix calculations may be performed. On the other hand, in the first to third operation examples, 54 (=15+14+13+12) times of matrix calculations may be needed. As described above, according to the first to third operation examples, if the service mobile terminal number is relatively small, it is possible to further reduce the processing load for the selection of the communication-target mobile terminals 20.

(10) First Modified Operation Example in Fourth Operation Example

Figure 10:
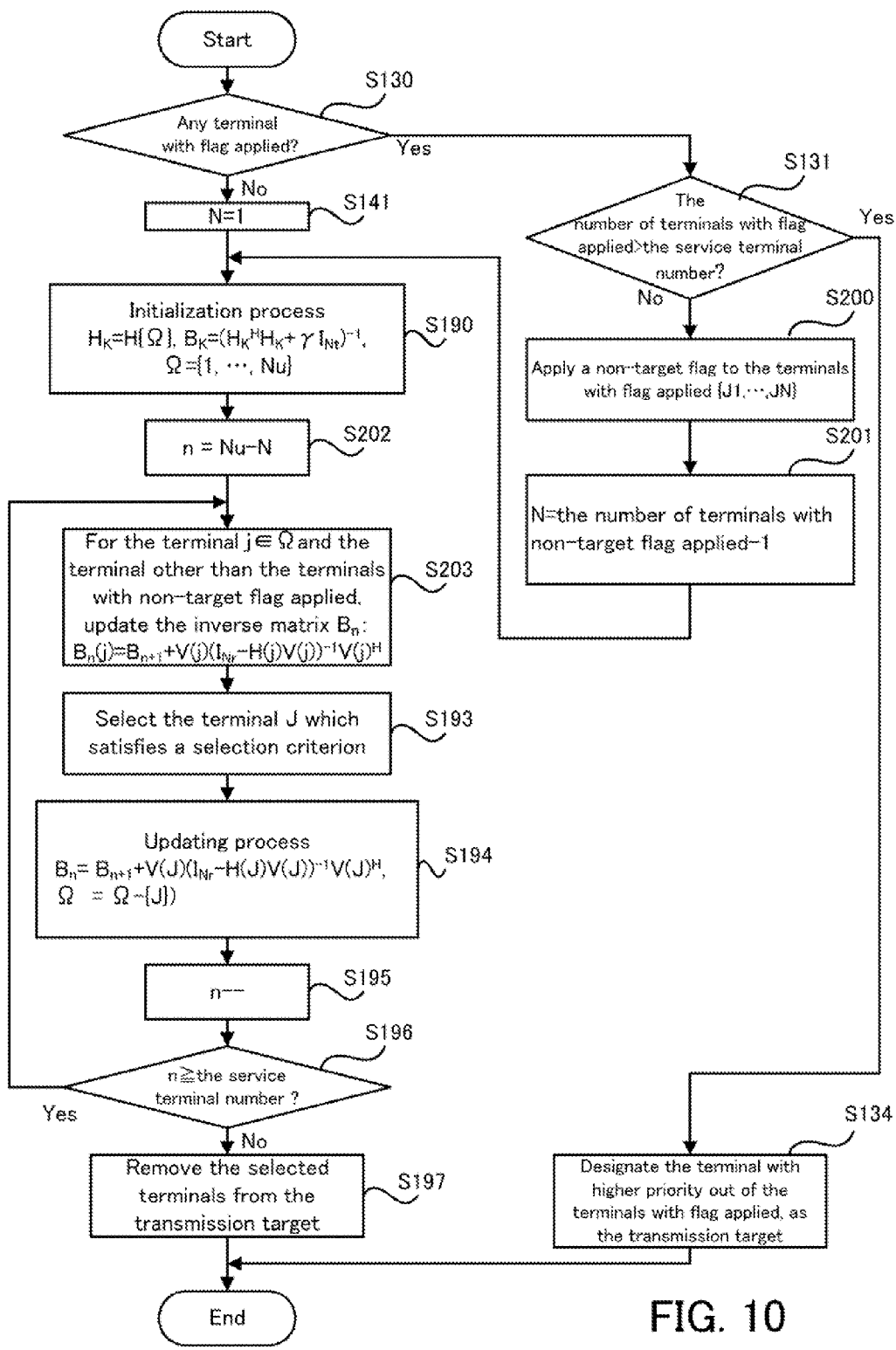
FIG. 10 is a flowchart illustrating a flow of a first modified operation example in the fourth operation example.

With reference to FIG. 10, a first modified operation example in the fourth operation example will be explained. FIG. 10 is a flowchart illustrating a flow of the first modified operation example in the fourth operation example. Incidentally, the same operations as the aforementioned operations which are already explained will carry the same step numbers, and the detailed explanation thereof will be omitted.

As illustrated in FIG. 10, the mobile terminal selection unit 16 judges whether or not there is the mobile terminal 20 to which the priority flag is applied (the step S130).

As a result of the judgment in the step S130, if it is judged that there is not the mobile terminal 20 to which the priority flag is applied (the step S130: No), the mobile terminal selection unit 16 sets the variable N to 1 (the step S141).

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (the step S131).

As a result of the judgment in the step S131, if it is judged that the number of the mobile terminal 20 to which the priority flag is applied is greater than the service mobile terminal number (the step S131: Yes), the mobile terminal selection unit 16 designates the mobile terminal 20 with higher (or relatively high) priority from among the mobile terminals 20 to each of which the priority flag is applied, as the communication-target of the wireless base station 10 (the step S134).

On the other hand, as a result of the judgment in the step S131, if it is judged that the number of the mobile terminal 20 to which the priority flag is applied is not greater than the service mobile terminal number (the step S131: No), the mobile terminal selection unit 16 applies a non-target flag to the mobile terminals 20 to each of which the priority flag applied (step S200). The non-target flag indicates to be removed from the selection target in the step S193. Then, the mobile terminal selection unit 16 sets the variable N to a value obtained by subtracting 1 from the number of the mobile terminal 20 to which the on-target flag is applied in the step S200 (step S201).

After the operation in the step S141 or the step S201, the mobile terminal selection unit 16 performs the initialization operation for the operation of selecting the mobile terminal 20 (the step S190).

Then, the mobile terminal selection unit 16 sets the variable n to Nu-N (step S202). Then, the mobile terminal selection unit 16 calculates the inverse matrix $B_n(j)$ after the updating from the inverse matrix $B_{n+1}$ before the updating, for each of the mobile terminals 20-$j$ which belong to the set $\Omega$ and to each of which the non-target flag is not applied (step S203). After that, as in the fourth operation example, the operations from the step S193 to the step S197 are performed.

As explained above, according to the first modified operation example in the fourth operation example, it is possible to preferably receive the same effects as those received by the fourth operation example described above. In addition, according to the first modified operation example in the fourth operation example, it is possible to preferentially select the mobile terminals 20 to which the priority flag is applied, as the communication-target. Thus, even in the case where a part of the mobile terminals 20 hardly or cannot perform the communication in some channel situation, it is possible to ensure the communication with the part of the mobile terminals 20.

(11) Second Modified Operation Example in Fourth Operation Example

Figure 11:
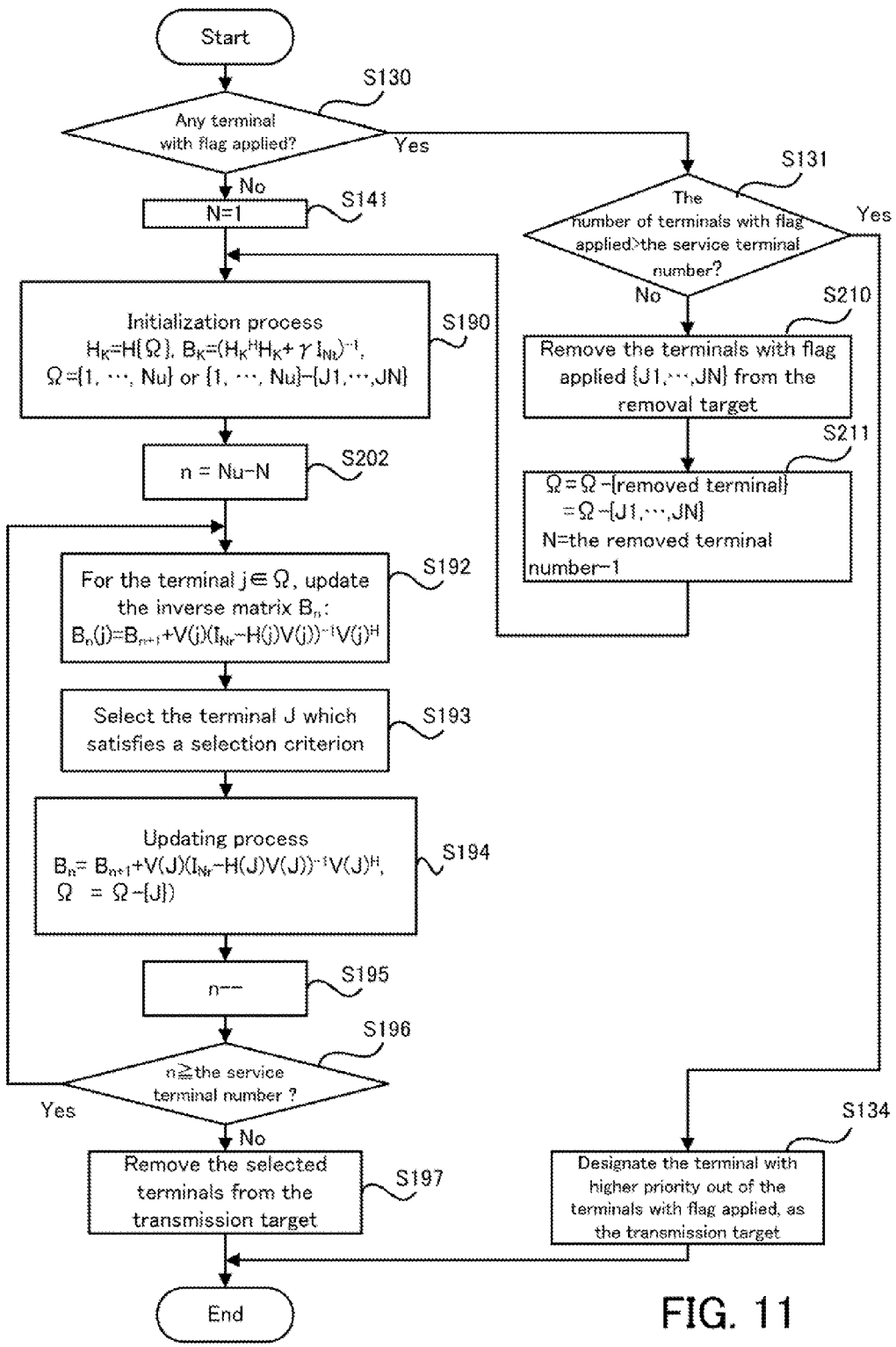
FIG. 11 is a flowchart illustrating a flow of a second modified operation example in the fourth operation example.

With reference to FIG. 11, a second modified operation example in the fourth operation example will be explained. FIG. 11 is a flowchart illustrating a flow of the second modified operation example in the fourth operation example. Incidentally, the same operations as the aforementioned operations which are already explained will carry the same step numbers, and the detailed explanation thereof will be omitted.

As illustrated in FIG. 11, the mobile terminal selection unit 16 judges whether or not there is the mobile terminal 20 to which the priority flag is applied (the step S130).

As a result of the judgment in the step S130, if it is judged that there is not the mobile terminal 20 to which the priority flag is applied (the step S130: No), the mobile terminal selection unit 16 sets the variable N to 1 (the step S141).

On the other hand, as a result of the judgment in the step S130, if it is judged that there is the mobile terminal 20 to which the priority flag is applied (the step S130: Yes), the mobile terminal selection unit 16 judges whether or not the number of the mobile terminal 20 to which the priority flag is applied is greater than the service mobile terminal number (the step S131).

As a result of the judgment in the step S131, if it is judged that the number of the mobile terminals 20 to which the priority flag is applied is greater than the service mobile terminal number (the step S131: Yes), the mobile terminal selection unit 16 designates the mobile terminal 20 with higher (or relatively high) priority from among the mobile terminals 20 to each of which the priority flag is applied, as the communication-target of the wireless base station 10 (the step S134).

On the other hand, as a result of the judgment in the step S131, if it is judged that the number of the mobile terminal 20 to which the priority flag is applied is not greater than the service mobile terminal number (the step S131: No), the mobile terminal selection unit 16 designates the mobile terminals 20 to each of which the priority flag is applied, as the mobile terminals 20 to be removed from the selection target in the step S193 (step S210). In association with the operation in the step S210, the mobile terminal selection unit 16 removes the mobile terminals 20-J1, 20-J2, . . . , and 20-Jx designated in the step S210, from the set Ω (step S211). Moreover, the mobile terminal selection unit 16 sets the variable N to a value obtained by subtracting 1 from the number x of the mobile terminals 20 designated in the step S210 (step S211).

After the operation in the step S141 or the step S211, the mobile terminal selection unit 16 performs the initialization operation for the operation of selecting the mobile terminal 20 (the step S190). However, if the set Ω is already set in the step S211, the mobile terminal selection unit 16 may not set the set Ω.

After that, as in the fourth operation example, the operations from the step S202 and the step S192 to the step S197 are performed.

As explained above, according to the second modified operation example in the fourth operation example, it is possible to preferably receive the same effects as those received by the fourth operation example described above.

With regard to the embodiment explained above, the following additional statements are further disclosed.

(Additional Statement 1)

A wireless base station for performing multiple input multiple output communication with a plurality of mobile terminals, the wireless base station including:

a selecting unit which selects a mobile terminal, which realizes such a condition that a parameter satisfies a predetermined criterion, from the plurality of mobile terminals, the parameter being defined by an inverse matrix of a predetermined matrix which is used to calculate a channel capacity between the plurality of mobile terminals and the wireless base station; and an updating unit which updates the inverse matrix on the basis of the selected mobile terminal every time the mobile terminal is selected by the selecting unit, the selecting unit selecting new mobile terminal, which realizes such a condition that the parameter defined by the updated inverse matrix satisfies the predetermined criterion, from the other mobile terminals except the mobile terminal selected by the selecting unit out of the plurality of mobile terminals, every time the inverse matrix is updated by the updating unit.

(Additional Statement 2)

The wireless base station according to the additional statement 1, wherein the inverse matrix $B_n$ at the time when n (wherein n is an integer of 1 or more) mobile terminals are selected from the plurality of mobile terminals is $B_n = (H_n H_n H + \gamma I_{n \times Nr})^{-1}$, $\gamma$ is a value obtained by dividing the number of antennas provided for the wireless base station by a signal-to-noise ratio, $I_{n \times Nr}$ is an identity matrix whose number of the rows is the number of antennas provided for the mobile terminal Nr×n, and $H_n$ is a channel matrix of the selected n mobile terminals, and the updating unit obtains the updated inverse matrix $B_{n+1}$ on the basis of an equation 31 when the (n+1)-th mobile terminal is newly selected by the selecting unit, $$B_{n+1} = \begin{bmatrix} B_n + U_2^H U_3 & -U_3^H \\ -U_3 & C_2^{-1} \end{bmatrix},$$ [Equation 31]

H(k) is a channel matrix of the selected (n+1)-th mobile terminal, $U_1 = H(k) H_n^H$,
$U_2 = U_1 B_n$,
$U_3 = C_2^{-1} U_2$, and
$C_2 = G(k) - U_2 U_1^H = (H(k)H(k)^H + \gamma I) - U_2 U_1^H$.

(Additional Statement 3)

The wireless base station according to the additional statement 2, wherein the selecting unit selects the mobile terminal which realizes a maximum entire capacity before starting the update of the inverse matrix, and the updating unit sets initial values of $H_1 = H(k)$ and $B_1 = G(k)^{-1} = (H(k)H(k)^H + \gamma I_{Nr})^{-1}$, H(k) is a channel matrix of the selected mobile terminal.

(Additional Statement 4)

The wireless base station according to the additional statement 2 or 3, wherein the selecting unit selects the mobile terminal which realizes (i) a maximum entire capacity of the channel capacity which is obtained by individually adding each of the other mobile terminals, or (ii) a maximum added capacity which is added to the channel capacity by individually adding each of the other mobile terminals.

(Additional Statement 5)

The wireless base station according to the additional statement 4, wherein the entire capacity is an inverse of a determinant of the inverse matrix, and the added capacity is a determinant of a matrix $C_2$.

(Additional Statement 6)

The wireless base station according to the additional statement 1, wherein the inverse matrix $B_n$ at the time when n (wherein n is an integer of 1 or more) mobile terminals are selected from the plurality of mobile terminals is $B_n=(H_n{}^H H_n+\gamma I_{Nt})^{-1}$, $\gamma$ is a value obtained by dividing the number of antennas provided for the wireless base station by a signal-to-noise ratio, $I_{Nr}$ is an identity matrix whose number of the rows is the number of antennas provided for the mobile terminal Nr, $I_{Nt}$ is an identity matrix whose number of the rows is the number of antennas provided for the wireless base station Nt, and $H_n$ is a channel matrix of the selected n mobile terminals, and the updating unit obtains the updated inverse matrix $B_{n+1}$ on the basis of an equation 32 when the (n+1)-th mobile terminal is newly selected by the selecting unit, $$B_{n+1}=B_n-U(I_{Nr}+H(k)U)^{-1}U^H, \quad \text{[Equation 32]}$$

$H(k)$ is a channel matrix of the selected (n+1)-th mobile terminal and $U=B_n H(k)H$.

(Additional Statement 7)

The wireless base station according to the additional statement 6, wherein the updating unit sets initial values of $H_0=\{\}$ and $B_0=\rho I_{Nt}$, $\rho$ is a signal-to-noise ratio.

(Additional Statement 8)

The wireless base station according to the additional statement 5, wherein the selecting unit selects the mobile terminal which realizes (i) a maximum entire capacity of the channel capacity obtained by individually adding each of the other mobile terminals, or (ii) a minimum mean square error of the inverse matrix corresponding to each of the other mobile terminals.

(Additional Statement 9)

The wireless base station according to the additional statement 8, wherein the entire capacity is an inverse of a determinant of the inverse matrix, and the mean square error is a sum of on-diagonal elements of the inverse matrix.

(Additional Statement 10)

The wireless base station according to the additional statement 2 or 6, wherein the selecting unit selects the mobile terminal as a mobile terminal which is a communication-target of the wireless base station.

(Additional Statement 11)

The wireless base station according to claim 1, wherein the updating unit sets an initial value of $B_K=(H_K{}^H H_K+\gamma I_{Nt})^{-1}$, $\gamma$ is a value obtained by dividing the number of antennas provided for the wireless base station by a signal-to-noise ratio, $I_{Nt}$ is an identity matrix whose number of the rows is the number of antennas provided for the wireless base station Nt, and $H_K$ is a channel matrix of the plurality of mobile terminals, and the updating unit obtains the updated inverse matrix $B_n$ on the basis of an equation 33 when the mobile terminal is newly selected by the selecting unit, $$B_n=B_{n+1}+V(I_{Nr}-H(k)V)^{-1}V^H, \quad \text{[Equation 33]}$$

$H(k)$ is a channel matrix of the selected mobile terminal and $V=B_{n+1}H(k)H$.

(Additional Statement 12)

The wireless base station according to the additional statement 11, wherein the selecting device selects the mobile terminal which realizes (i) a minimum mean square error of the inverse matrix obtained by individually removing each of the other mobile terminals, (ii) a maximum sum or maximum product of signal-to-noise ratios obtained by individually removing each of the other mobile terminals, or (iii) a minimum entire capacity of the channel capacity obtained by individually removing each of the other mobile terminals.

(Additional Statement 13)

The wireless base station according to the additional statement 12, wherein the mean square error is a sum of on-diagonal elements of the inverse matrix, the sum of the signal-to-noise ratios is a value obtained by adding the inversed on-diagonal elements of the inverse matrix, the sum of the signal-to-noise ratios is an inverse of the product of the on-diagonal elements of the inverse matrix, and the entire capacity is an inverse of a determinant of the inverse matrix.

(Additional Statement 14)

The wireless base station according to the additional statement 12, wherein the selecting unit selects the mobile terminal as a mobile terminal to be removed from a communication-target of the wireless base station.

(Additional Statement 15)

The wireless base station according to the additional statement 1, wherein the selecting unit (i) preferentially selects the mobile terminal whose selection priority is set to be relatively high and the mobile terminal from which communication requests are performed predetermined times or more, before selecting the mobile terminal on the basis of the inverse matrix, and then (ii) selects new mobile terminal, which realizes such a condition that the parameter defined by the inverse matrix satisfies the predetermined criterion, from the other mobile terminals except the preferentially selected mobile terminals.

(Additional Statement 16)

A method of selecting a mobile terminal in a wireless base station for performing multiple input multiple output communication with a plurality of mobile terminals, the method includes:

a selecting process which selects a mobile terminal, which realizes such a condition that a parameter satisfies a predetermined criterion from the plurality of mobile terminals, the parameter being defined by an inverse matrix of a predetermined matrix which is used to calculate a channel capacity between the plurality of mobile terminals and the wireless base station; and an updating process which updates the inverse matrix on the basis of the selected mobile terminal every time the mobile terminal is selected by the selecting process, the selecting process selecting new mobile terminal, which realizes such a condition that the parameter defined by the updated inverse matrix satisfies the predetermined criterion, from the other mobile terminals except the mobile terminal selected by the selecting process out of the plurality of mobile terminals, every time the inverse matrix is updated by the updating process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station for performing multiple input multiple output communication with a plurality of mobile terminals, the wireless base station comprising:

a selecting unit which selects a mobile terminal, wherein the selected mobile terminal realizes that a parameter satisfies a predetermined criterion, from the plurality of mobile terminals, the parameter being defined by an inverse matrix of a predetermined matrix which is used to calculate a channel capacity between the plurality of mobile terminals and the wireless base station; and an updating unit which updates the inverse matrix based on the selected mobile terminal, every time the mobile terminal is selected by the selecting unit, the selecting unit selecting new mobile terminal, wherein the new mobile terminal realizes that the parameter defined by the updated inverse matrix satisfies the predetermined criterion, from the other mobile terminals except the mobile terminal selected by the selecting unit out of the plurality of mobile terminals, every time the inverse matrix is updated by the updating unit, wherein the inverse matrix $B_n$ at the time when n (wherein n is an integer of 1 or more) mobile terminals are selected from the plurality of mobile terminals is $B_n=(H_n H_n^H+\gamma I_{n\times Nr})^{-1}$, wherein $\gamma$ is a value obtained by dividing the number of antennas provided for the wireless base station by a signal-to-noise ratio, $I_{n\times Nr}$ is an identity matrix whose number of the rows is the number of antennas provided for the mobile terminal Nr×n, and $H_n$ is a channel matrix of the selected n mobile terminals, and the updating unit obtains the updated inverse matrix $B_{n+1}$ based on an equation 1 when the (n+1)-th mobile terminal is newly selected by the selecting unit, $$B_{n+1} = \begin{bmatrix} B_n + U_2^H U_3 & -U_3^H \\ -U_3 & C_2^{-1} \end{bmatrix},$$ [Equation 1]

wherein

H(k) is a channel matrix of the selected (n+1)-th mobile terminal, $U_1=H(k)H_n^H$, $U_2=U_1 B_n$, $U_3=C_2^{-1} U_2$, and $C_2=G(k)-U_2 U_1^H=(H(k)H(k)^H+\gamma I)-U_2 U_1^H$.

2. The wireless base station according to claim 1, wherein the selecting unit selects the mobile terminal which realizes a maximum entire capacity before starting the update of the inverse matrix, and the updating unit sets initial values of $H_1=H(k)$ and $B_1=G(k)^{-1}=(H(k)H(k)^H+\gamma I_{Nr})^{-1}$, H(k) is a channel matrix of the selected mobile terminal.

3. The wireless base station according to claim 1, wherein the selecting unit selects the mobile terminal which realizes (i) a maximum entire capacity of the channel capacity which is obtained by individually adding each of the other mobile terminals, or (ii) a maximum added capacity which is added to the channel capacity by individually adding each of the other mobile terminals.

4. The wireless base station according to claim 1, wherein the selecting unit (i) preferentially selects the mobile terminal whose selection priority is set to be relatively high and the mobile terminal from which communication requests are performed predetermined times or more, before selecting the mobile terminal based on the inverse matrix, and then (ii) selects new mobile terminal, wherein the new mobile terminal realizes that the parameter defined by the inverse matrix satisfies the predetermined criterion, from the other mobile terminals except the preferentially selected mobile terminals.

5. A wireless base station for performing multiple input multiple output communication with a plurality of mobile terminals, the wireless base station comprising:

a selecting unit which selects a mobile terminal, wherein the selected mobile terminal realizes that a parameter satisfies a predetermined criterion, from the plurality of mobile terminals, the parameter being defined by an inverse matrix of a predetermined matrix which is used to calculate a channel capacity between the plurality of mobile terminals and the wireless base station; and an updating unit which updates the inverse matrix based on the selected mobile terminal, every time the mobile terminal is selected by the selecting unit, the selecting unit selecting new mobile terminal, wherein the new mobile terminal realizes that the parameter defined by the updated inverse matrix satisfies the predetermined criterion, from the other mobile terminals except the mobile terminal selected by the selecting unit out of the plurality of mobile terminals, every time the inverse matrix is updated by the updating unit, wherein the inverse matrix $B_n$ at the time when n (wherein n is an integer of 1 or more) mobile terminals are selected from the plurality of mobile terminals is $B_n=(H_n^H H_n+\gamma I_{Nt})^{-1}$, $\gamma$ is a value obtained by dividing the number of antennas provided for the wireless base station by a signal-to-noise ratio, $I_{Nr}$ is an identity matrix whose number of the rows is the number of antennas provided for the mobile terminal Nr, $I_{Nt}$ is an identity matrix whose number of the rows is the number of antennas provided for the wireless base station Nt, and $H_n$ is a channel matrix of the selected n mobile terminals, and the updating unit obtains the updated inverse matrix $B_{n+1}$ based on an equation 2 when the (n+1)-th mobile terminal is newly selected by the selecting unit, $$B_{n+1}=B_n-U(I_{Nr}+H(k)U)^{-1}U^H, \quad \text{[Equation 2]}$$

H(k) is a channel matrix of the selected (n+1)-th mobile terminal and $U=B_n H(k)^H$.

6. The wireless base station according to claim 5, wherein the updating unit sets initial values of $H_0=\{\}$ and $B_0=\rho I_{Nt}$, $\rho$ is a signal-to-noise ratio.

7. The wireless base station according to claim 5, wherein the selecting unit selects the mobile terminal which realizes (i) a maximum entire capacity of the channel capacity obtained by individually adding each of the other mobile terminals, or (ii) a minimum mean square error of the inverse matrix corresponding to each of the other mobile terminals.

8. A wireless base station for performing multiple input multiple output communication with a plurality of mobile terminals, the wireless base station comprising:

a selecting unit which selects a mobile terminal, wherein the selected mobile terminal realizes that a parameter satisfies a predetermined criterion, from the plurality of mobile terminals, the parameter being defined by an inverse matrix of a predetermined matrix which is used to calculate a channel capacity between the plurality of mobile terminals and the wireless base station; and an updating unit which updates the inverse matrix based on the selected mobile terminal, every time the mobile terminal is selected by the selecting unit, the selecting unit selecting new mobile terminal, wherein the new mobile terminal realizes that the parameter defined by the updated inverse matrix satisfies the predetermined criterion, from the other mobile terminals except the mobile terminal selected by the selecting unit out of the plurality of mobile terminals, every time the inverse matrix is updated by the updating unit, wherein the updating units sets an initial value of $B_K=(H_K^H H_K + \gamma I_{Nt})^{-1}$, $\gamma$ is a value obtained by dividing the number of antennas provided for the wireless base station by a signal-to-noise ratio, $I_{Nt}$ is an identity matrix whose number of the rows is the number of antennas provided for the wireless base station N, and $H_K$ is a channel matrix of the plurality of mobile terminals, and the updating unit obtains the updated inverse matrix $B_n$ based on an equation 3 when the mobile terminal is newly selected by the selecting unit, $$B_n=B_{n+1}+V(I_{Nr}-H(k)V)^{-1}V^H, \quad \text{[Equation 3]}$$

H(k) is a channel matrix of the selected mobile terminal and $V=B_{n+1}H(k)^H$.

9. The wireless base station according to claim 8, wherein the selecting unit selects the mobile terminal which realizes (i) a minimum mean square error of the inverse matrix obtained by individually removing each of the other mobile terminals, (ii) a maximum sum or maximum product of signal-to-noise ratios obtained by individually removing each of the other mobile terminals, or (iii) a minimum entire capacity of the channel capacity obtained by individually removing each of the other mobile terminals.

10. A method of selecting a mobile terminal in a wireless base station for performing multiple input multiple output communication with a plurality of mobile terminals, the method comprising:

a selecting process which selects a mobile terminal, wherein the selected mobile terminal realizes that a parameter satisfies a predetermined criterion, from the plurality of mobile terminals, the parameter being defined by an inverse matrix of a predetermined matrix which is used to calculate a channel capacity between the plurality of mobile terminals and the wireless base station; and an updating process which updates the inverse matrix based on the selected mobile terminal every time the mobile terminal is selected by the selecting process, the selecting process selecting new mobile terminal, wherein the new mobile terminal realizes that the parameter defined by the updated inverse matrix satisfies the predetermined criterion, from the other mobile terminals except the mobile terminal selected by the selecting process out of the plurality of mobile terminals, every time the inverse matrix is updated by the updating process, wherein the inverse matrix $B_n$ at the time when n (wherein n is an integer of 1 or more) mobile terminals are selected from the plurality of mobile terminals is $B_n=(H_n H_n^H + \gamma I_{n \times Nr})^{-1}$, wherein $\gamma$ is a value obtained by dividing the number of antennas provided for the wireless base station by a signal-to-noise ratio, $I_{n \times Nr}$ is an identity matrix whose number of the rows is the number of antennas provided for the mobile terminal Nr×n, and $H_n$ is a channel matrix of the selected n mobile terminals, and he updating process obtains the updated inverse matrix $B_{n+1}$ based on an equation 1 when the (n+1)-th mobile terminal is newly selected by the selecting process, $$B_{n+1}=\begin{bmatrix} B_n + U_2^H U_3 & -U_3^H \\ -U_3 & C_2^{-1} \end{bmatrix}, \quad \text{[Equation 1]}$$

wherein

H(k) is a channel matrix of the selected (n+1)-th mobile terminal, $U_1=H(k)H_n^H$, $U_2=U_1 B_n$, $U_3=C_2^{-1}U_2$, and $C_2=G(k)-U_2 U_1^H=(H(k)H(k)^H+\gamma I)-U_2 U_1^H$.

* * * * *